(12) United States Patent
Yuen et al.

(10) Patent No.: US 8,503,431 B2
(45) Date of Patent: Aug. 6, 2013

(54) MOBILE PHONE RELATED INDIRECT COMMUNICATION SYSTEM AND METHOD

(75) Inventors: Pak Kay Yuen, Hong Kong (CN); Johan Eliasch, London (GB)

(73) Assignee: Wireless Wonders Ltd., Tortola (VG)

( * ) Notice: Subject to any disclaimer, the term of this patent is extended or adjusted under 35 U.S.C. 154(b) by 1442 days.

(21) Appl. No.: 11/808,753

(22) Filed: Jun. 12, 2007

(65) Prior Publication Data

US 2008/0049722 A1 Feb. 28, 2008

Related U.S. Application Data

(60) Provisional application No. 60/840,005, filed on Aug. 25, 2006.

(51) Int. Cl.
*H04L 12/66* (2006.01)

(52) U.S. Cl.
USPC ........... 370/352; 370/353; 370/354; 455/417; 455/553.1

(58) Field of Classification Search
None
See application file for complete search history.

(56) References Cited

U.S. PATENT DOCUMENTS

| | | | |
|---|---|---|---|
| 5,140,626 A | 8/1992 | Ory et al. | |
| 5,867,495 A | 2/1999 | Elliott et al. | |
| 6,069,890 A | 5/2000 | White et al. | |
| 6,236,716 B1 | 5/2001 | Marcus et al. | |
| 6,571,092 B2 | 5/2003 | Faccin et al. | |
| 6,853,714 B2 | 2/2005 | Liljestrand et al. | |
| 6,868,080 B1 * | 3/2005 | Umansky et al. | 370/354 |
| 6,931,249 B2 | 8/2005 | Fors et al. | |
| 6,940,847 B1 | 9/2005 | Glitho et al. | |
| 6,965,914 B2 | 11/2005 | Dowling | |
| 6,970,909 B2 | 11/2005 | Schulzrinne | |
| 6,982,985 B1 | 1/2006 | Bohacek et al. | |
| 6,990,094 B1 | 1/2006 | O'Neal et al. | |
| 7,020,268 B2 | 3/2006 | Pelletier et al. | |
| 7,099,309 B2 | 8/2006 | Davidson | |
| 2002/0082028 A1 | 6/2002 | Wittenkamp | |
| 2003/0021400 A1 | 1/2003 | Gradgent | |
| 2003/0043787 A1 | 3/2003 | Emerson | |

(Continued)

FOREIGN PATENT DOCUMENTS

| | | |
|---|---|---|
| GB | 2378086 | 1/2003 |
| JP | 8-79827 | 3/1996 |

(Continued)

OTHER PUBLICATIONS

International Search Report and Written Opinion issued in corresponding International Patent Application No. PCT/GB2007/003200, mailed on Dec. 6, 2007.

(Continued)

*Primary Examiner* — Asad Nawaz
*Assistant Examiner* — Justin N Mullen

(57) ABSTRACT

An indirect communication system and a method of indirect communication include a mobile phone as either a calling device or receiving device. The mobile phone calls another device to set up a prospective communication, and then uses Voice over Internet Protocol (VoIP) to communicate with the other device over the Internet. The receiving device receives a generated signal notifying the receiving device of a proposed communication with the calling device. A server sets up a meeting point channel after the calling device has connected to the server. The server receives outgoing VoIP packets from the calling device and redirects the outgoing VoIP packets to the receiving device.

36 Claims, 25 Drawing Sheets

(56) References Cited

U.S. PATENT DOCUMENTS

| | | | |
|---|---|---|---|
| 2003/0095542 A1 | 5/2003 | Chang et al. | |
| 2004/0114581 A1 | 6/2004 | Hans et al. | |
| 2004/0133668 A1 | 7/2004 | Nicholas | |
| 2004/0146021 A1 | 7/2004 | Fors et al. | |
| 2004/0203788 A1 | 10/2004 | Fors et al. | |
| 2004/0248593 A1 | 12/2004 | Hicks, III et al. | |
| 2004/0258238 A1 | 12/2004 | Wong | |
| 2005/0048981 A1 | 3/2005 | Anupam et al. | |
| 2005/0068929 A1 | 3/2005 | Chang et al. | |
| 2005/0073995 A1* | 4/2005 | Yeh et al. | 370/352 |
| 2005/0086344 A1 | 4/2005 | Suesserman | |
| 2005/0096024 A1 | 5/2005 | Bicker et al. | |
| 2005/0105705 A1 | 5/2005 | Elcock et al. | |
| 2005/0117566 A1 | 6/2005 | Davidson | |
| 2005/0147049 A1 | 7/2005 | Ganesan | |
| 2005/0152343 A1 | 7/2005 | Rajagopalan | |
| 2005/0152347 A1 | 7/2005 | Chen et al. | |
| 2005/0152521 A1 | 7/2005 | Liljestrand | |
| 2005/0159153 A1 | 7/2005 | Mousseau et al. | |
| 2005/0175161 A1 | 8/2005 | Reynolds et al. | |
| 2005/0186960 A1 | 8/2005 | Jiang | |
| 2005/0190747 A1 | 9/2005 | Sindhwani et al. | |
| 2005/0227670 A1 | 10/2005 | Bicker et al. | |
| 2005/0271020 A1 | 12/2005 | Thermond | |
| 2005/0286466 A1* | 12/2005 | Tagg et al. | 370/329 |
| 2006/0019667 A1 | 1/2006 | Hicks | |
| 2006/0077943 A1 | 4/2006 | Liu et al. | |
| 2006/0080344 A1 | 4/2006 | McKibben et al. | |
| 2006/0101116 A1 | 5/2006 | Rittman et al. | |
| 2006/0121916 A1 | 6/2006 | Aborn et al. | |
| 2006/0126594 A1 | 6/2006 | Tu | |
| 2006/0153354 A1 | 7/2006 | Brahm et al. | |
| 2006/0168326 A1 | 7/2006 | Baldwin et al. | |
| 2006/0229098 A1* | 10/2006 | LaBauve et al. | 455/552.1 |
| 2007/0147315 A1* | 6/2007 | Khoury et al. | 370/338 |
| 2007/0268841 A1* | 11/2007 | Dube et al. | 370/254 |

FOREIGN PATENT DOCUMENTS

| | | |
|---|---|---|
| JP | 09-321806 | 12/1997 |
| JP | 10-322391 | 12/1998 |
| JP | 11-122388 | 4/1999 |
| JP | 11-177719 | 7/1999 |
| JP | 2000-244491 | 9/2000 |
| JP | 2001-103155 | 4/2001 |
| JP | 2004-186989 | 7/2004 |
| JP | 2004-236294 | 8/2004 |
| JP | 2004-266326 | 9/2004 |
| JP | 2006-67299 | 3/2006 |
| JP | 2006-80690 | 3/2006 |
| RU | 2232478 | 7/2004 |
| WO | 2005/039115 | 4/2005 |
| WO | WO2005/039114 * | 4/2005 |
| WO | WO 2005/039114 A1 * | 4/2005 |
| WO | 2005/050960 | 6/2005 |
| WO | 2005/067635 | 7/2005 |
| WO | 2005/081962 | 9/2005 |
| WO | 2006/004654 | 1/2006 |

OTHER PUBLICATIONS

Samsung, "Mobile WiMAX—Complete Access to High-Speed Mobile Internet," 1995-2006.
Institute of Electrical and Electronics Engineers, "IEEE 802.16.2: Coexistence of Fixed Broadband Wireless Access Systems," Mar. 17, 2004.
Saudi Arabia 1$^{st}$ Examination Report.
Russian Federation Office Action dated Jun. 26, 2009 in corresponding Russian Application No. 2009110765/20 (014631).
Russian Office Action issued in corresponding Russian Patent Application No. 2009110765/08(014631), received Nov. 29, 2011.
Summary of Indonesian Office Action issued in corresponding Indonesian Patent Application No. W-00200900511, received Nov. 29, 2011.
Mexican Office Action mailed Jun. 10, 2011 in corresponding Application No. MX/a/2009/001976.
Japanese Office Action for Application No. 2009-525107 issued May 25, 2012.
Russian Decision of Grant issued Dec. 28, 2011 in corresponding Russian Patent Application No. 2009110765.
English Translation of Chinese Office Action dated Apr. 5, 2012 issued in corresponding Chinese Patent Application No. 200780040123.6.
Notice of Allowance mailed in corresponding Japanese Application No. 2009-525107 on Jan. 8, 2013.
Chinese Office Action for application No. 200780040123.6 issued Dec. 4, 2012.
European Search Report mailed Mar. 15, 2013 in 07 789 293.3-1856.
Chinese Office Action issued Apr. 15, 2013 for corresponding Chinese Application No. 200780040123.6.

* cited by examiner

MOBILE PHONE RELATED INDIRECT COMMUNICATION SYSTEM AND METHOD

CROSS-REFERENCE TO RELATED APPLICATION

The subject application claims priority to U.S. Provisional Application Ser. No. 60/840,005, filed Aug. 25, 2006, the disclosure of which is incorporated herein by reference.

BACKGROUND OF THE INVENTION

1. Field of the Invention

The invention relates generally to a device and method of making and receiving relatively low cost, high quality phone calls using a mobile phone with wireless media and Voice over Internet Protocol (VoIP).

2. Description of the Related Art

A call made with a mobile phone is carried over the same channel that carried the notifier or ring-tone that established the connection. Thus, charges accrue for the airtime required to maintain the channel, as well as for the notifier or ring-tone. Furthermore, the communication quality of a mobile phone is subject to the vagaries of wireless and VoIP communication.

SUMMARY

A primary object of the invention is to overcome the deficiencies of the related art described above by providing a mobile phone related indirect communication system, and a method thereof.

A further object of the invention is to provide low cost and relatively high quality calls for mobile phone users. In one embodiment, use of a protocol such as WiMAX would ensure that the radio frequencies (RF) used for wireless communication are compatible throughout the international community. In this embodiment, a single mobile phone may be used in any country. The Internet, and particularly Voice over Internet Protocol (VoIP), offers a well established and standardized unified environment for both transmitting and receiving for mobile users around the world. Thus, indirect communication can be used for providing low cost mobile phone communication on a global scale.

In an aspect of an indirect communication system, an independent signal such as a short (one or two) ringing tone is sent to a receiving device, which may be a mobile phone. The independent signal lets the receiving device know that someone with Voice over Internet Protocol capability is waiting at a "meeting point" somewhere on the Internet. The receiving device can then connect to the Internet and go to the agreed meeting point and talk.

In an aspect of a method of indirect communication, a calling device, which may be a mobile phone, sends a short signal, which can be a one or two ringing tone signal, to a receiving device. After sending the ringing tone, the calling device, in general, may hang up so that no phone charges accrue. The calling device connects to the Internet and goes to an agreed meeting point, waiting for the receiving device to come (or to meet) and talk. The meeting point on the Internet can be a specific IP (Internet Protocol) address such as xxx.xxx.xxx.xxx, a server (or a PC), or a dedicated Web Site. After the receiving device receives the ringing tone, it connects to the Internet at the agreed meeting point and starts to talk to the calling device using VoIP on the Internet.

In an aspect of an indirect communication system, the indirect communication system includes a notifier notifying a receiving device of a prospective communication in response to an instruction from a calling device, a meeting point generator organizing a meeting point channel in response to the instruction, and the meeting point channel receiving packets from the calling device and redirecting the packets to the receiving device.

In embodiment, either the receiving device, the calling device, or both may be a handset, a phone, a mobile phone, a cellular phone, a radio, a personal digital assistant, a gateway, a base station, a server, a cell tower, a transceiver, or a computer.

In one embodiment, the notifier, which may reside on either a server or the calling device, may generate a discrete multi-tone (DMT) ring tone, which may include an address of the meeting point channel.

In one embodiment, the address of the meeting point channel may be comprised of a name or an identification number together with an Internet Protocol (IP) address or a Domain Name System (DNS) name identifying the communication channel.

In one embodiment, a meeting point channel is pre-defined and represents a fixed communication channel.

In one embodiment, a meeting point channel is generated at the time a need arises.

In one embodiment, the address of the meeting point channel may be comprised of an identification number of the receiving device and an Internet Protocol (IP) address or a Domain Name System (DNS) name.

In one embodiment, the address of the meeting point channel identifying the receiving device belongs to the receiving device. In this case, the meeting point channel is the home meeting point of the receiving device.

In one embodiment, the calling device connects to the meeting point channel of the receiving device and waits for the receiving device to start communication.

In one embodiment, the receiving device connects to the home meeting point if the receiving device accepts the communication.

In one embodiment, the receiving device sends a decline message to the meeting point channel, and the meeting point channel relays the decline signal to the calling device, if the receiving device declines the communication.

In one embodiment, the receiving device connects to the alternative meeting point channel if the receiving (or sending) device suggests an alternative meeting point channel.

In one embodiment, the received packets may include a source address of the calling device and a delivery address of a meeting point channel.

In one embodiment, the redirecting may comprise changing a delivery address of each redirected packet header from the address of the meeting point channel to the address of the receiving device, as well as changing the source address of each redirected packet header to the address of the meeting point channel.

In one embodiment, the indirect communication system further includes a plurality of receiving devices, and each packet received from the calling device is copied a plurality of times at the meeting point channel, and each of the copied packets is redirected to one of the plurality of receiving devices.

In an aspect of an indirect communication method, the method of communication includes the operations of notifying a receiving device of a prospective communication in response to an instruction from a calling device, organizing a meeting point channel in response to the instruction, receiving packets from the calling device at the meeting point channel, and redirecting the packets to the receiving device at the meeting point channel.

In one embodiment, the method includes copying each packet received from the calling device a plurality of times at the meeting point channel, and redirecting each of the copied packets to one of a plurality of receiving devices.

In one embodiment of the indirect communication method, the receiving device is a handset, a phone, a gateway, a base station, a server, a cell tower, a transceiver, or a computer.

In one embodiment of the indirect communication method, the calling device is a handset, a phone, a gateway, a base station, a server, cell tower, a transceiver, or a computer.

In one embodiment of the indirect communication method, the meeting point channel is generated in a server, a computer, a base station, a handset, a Voice over Internet Protocol handset, a Voice over Internet Protocol controller, a switch box, or a dedicated black box device and peripherals.

In one embodiment of the indirect communication method, the meeting point channel comprises Voice over Internet Protocol controlling and administration matrices to handle large number of calls simultaneously.

In one embodiment, the meeting point channel is generated in a server, a computer, a base station, a handset, a Voice over Internet Protocol handset, a Voice over Internet Protocol controller, a switch box, or a dedicated black box device with peripherals.

In one embodiment, the meeting point channel includes Voice over Internet Protocol controlling and administration matrices to handle a large number of calls simultaneously.

In one embodiment, the notifier generates a multi-tone ring tone.

In one embodiment, the notifier resides on a server.

In one embodiment, the notifier resides on the calling device.

In one embodiment, an address of the meeting point channel includes an identification number of the receiving device and an Internet Protocol address or a Domain Name System name of the meeting point generator, i.e. a home meeting point of the receiving device.

In one embodiment, if the receiving device accepts the communication, the receiving device connects to the home meeting point channel.

In one embodiment, if the receiving device declines the communication, the receiving device sends a decline message to the meeting point channel and the meeting point channel relays the decline message to the calling device.

In one embodiment, if the receiving device suggests an alternative meeting point channel, the receiving device connects to the alternative meeting point channel.

In one embodiment, the received packets may be formatted using Voice over Internet Protocol, Internet Protocol, or User Datagram Protocol.

In one embodiment, the redirecting includes changing a sending address of each packet header from an address of the meeting point channel to an address of the receiving device.

In one embodiment, the calling device operates on a first network, and the receiving device operates on a second network, the second network being incompatible with the first network, and the notifier includes an instruction about the first network.

In one embodiment, the receiving device is notified of the calling device's network, and activates at the receiving device software associated with the network of the calling device.

In another aspect of the indirect communication system, the indirect communication system includes means for notifying a receiving device of a prospective communication in response to an instruction from a calling device, means for organizing a meeting point channel in response to the instruction, a means for receiving packets from the calling device at the meeting point channel, and means for redirecting the packets to the receiving device at the meeting point channel.

In another aspect of the indirect communication system, a phone device includes a transmitter transmitting a notifying signal to a receiving device and hanging up, the notifying signal notifying the receiving device of a prospective communication, and a connector receiving a communication signal from a server as a consequence of sending the notifying signal to the receiving device.

In another aspect of the indirect communication system, a phone device includes a receiver receiving a notifying signal from a calling device, and a connector sending a communication signal to a server in response to the notifying signal from the calling device, the communication signal conveying information accepting a prospective communication, declining the prospective communication, or agreeing to an alternative meeting point location for the prospective communication In another aspect of the indirect communication system, the indirect communication system includes a generator transmitting a two-ring ring tone signal after receiving an instruction from a calling device, a sender sending the two-ring ring tone signal to a receiving device, the two-ring ring tone notifying the receiving device of a prospective communication and sending an address of a meeting point channel, a meeting point creator creating the meeting point channel in a meeting point server after the calling device establishes a connection to the server, the meeting point channel being identified by a phone number of the receiving device and an address of the server, and a redirector receiving, in the meeting point channel, captured voice data in outgoing VoIP packets identified by a packet header, the packet header having a delivery address of the server and a source address of the calling device, and redirecting the outgoing VoIP packets to the receiving device by changing the delivery address of the packet header to an address of the receiving device and changing the source address of the packet header to an address of the server.

In another aspect of the indirect communication method, the method of communication includes transmitting a two-ring ring tone signal after receiving an instruction from a calling device, sending the two-ring ring tone signal to a receiving device, creating a meeting point channel in a meeting point server after the calling device establishes a connection with the server, receiving, in the meeting point channel, captured voice data in outgoing VoIP packets identified by a packet header, the packet header having a delivery address of the server and a source address of the calling device, and redirecting, in the meeting point channel, the outgoing VoIP packets to the receiving device by changing the delivery address of the packet header to an address of the receiving device and changing the source address of the packet header to an address of the server.

In another aspect of the indirect communication system, the indirect communication system includes a generator transmitting a two-ring ring tone signal after receiving an instruction from a calling device, a sender sending the two-ring ring tone signal to a receiving device, the two-ring ring tone notifying the receiving device of a prospective communication and sending an address of a meeting point channel, a meeting point creator creating the meeting point channel in a meeting point server after the calling device establishes a connection to the server, the meeting point channel being identified by a phone number of the receiving device and an address of the server, the calling device sending to a redirector captured voice data in outgoing VoIP packets identified by a packet header, the packet header having a delivery address of the server and a source address of the calling device, and the redirector redirecting the outgoing VoIP packets to the receiving device by changing the delivery address of the packet header to an address of the receiving device and changing the source address of the packet header to an address of the server.

In another aspect of the indirect communication method, the method of communication includes transmitting a two-ring ring tone signal after receiving an instruction from a calling device, sending the two-ring ring tone signal to a receiving device, creating a meeting point channel in a meeting point server after the calling device establishes a connection with the meeting point server, transmitting captured voice data in outgoing VoIP packets identified by a packet header from the calling device to a redirector at the meeting point channel, the packet header having a delivery address of the server and a source address of the calling device, and redirecting the outgoing VoIP packets to the receiving device in the meeting point channel by changing the delivery address of the packet header to an address of the receiving device, and changing the source address of the packet header to an address of the server, therefore saving costs and allowing the mobile phone to make and receive quality phone calls over the Internet.

In another aspect of the indirect communication system, a phone device includes a transmitter transmitting a notifying signal to a receiving device and hanging up, the notifying signal notifying the receiving device of a prospective communication, and a connector capable of receiving a communication signal from a server as a consequence of sending the notifying signal to the receiving device.

In another aspect of the indirect communication system, a phone device includes a receiver receiving a notifying signal from a calling device, and a connector capable of sending a communication signal to a server in response to the notifying signal from the calling device, the communication signal conveying information accepting a prospective communication, declining the prospective communication, or agreeing to an alternative meeting point location for the prospective communication.

In another aspect of the indirect communication system, an indirect communication system includes a calling device and a receiving device, the receiving device having a number, a signal emanating from the calling device to the number of the receiving device, and a meeting point channel identified by the number of the receiving device, in which the receiving device, responsive to the signal from the calling device, calls the meeting point channel identified by the number of the receiving device, the calling device calls the meeting point channel identified by the number of the receiving device, and packets received from the calling device at the meeting point channel are redirected to the receiving device at the meeting point channel.

In another aspect of the indirect communication system, an indirect communication system includes a calling device and a receiving device, the receiving device having a number or name, a signal emanating from the calling device to the number or the name of the receiving device, and a meeting point channel generated inside the server, the meeting point channel being identified by the number or the name of the receiving device, the meeting point channel being responsive to the signal from the calling device, and the meeting point channel being responsive to calls identified by the number or the name of the receiving device, wherein the calling device calls the meeting point channel identified by the number or the name of the receiving device, and wherein packets received from the calling device at the meeting point channel are redirected to the receiving device at the meeting point channel.

In one embodiment of the indirect communication system, the number or name of the receiving device is the number itself, the number with a prefix, the number with a suffix, a name associated with the number, an IP address, a name substitution, and a combination of the above-listed elements.

In one embodiment of the indirect communication system, the meeting point channel identified by the number of the receiving device is owned by the receiving device for ownership and administrative works.

In another aspect of the indirect communication system, an indirect communication system includes a calling device and a receiving device, the receiving device having a number or name, the calling device connecting to a server, a signal emanating to the number or the name of the receiving device from the server, and a meeting point channel generated inside the server, the meeting point channel being identified by the number of the receiving device, wherein the calling device, after being transferred to the meeting point channel identified by the number of the receiving device, waits for the receiving device, wherein the receiving device, responsive to the signal from the server, calls the meeting point channel identified by the number or the name of the receiving device, and wherein packets received from the calling device at the meeting point channel are redirected to the receiving device at the meeting point channel.

In another aspect of the indirect communication system, an indirect communication method includes sending a signal from a calling device to a receiving device, responding to the signal from the calling device by calling a meeting point channel identified by a number of the receiving device with the receiving device, calling the meeting point channel identified by the number of the receiving device with the calling device, receiving packets from the calling device at the meeting point channel, and redirecting the packets to the receiving device at the meeting point channel.

In another aspect of the indirect communication system, an indirect communication method includes sending a signal from a calling device to a receiving device, at the time the signal is sent, the calling device connects to the home meeting point of the receiving device waiting, after receiving the signal, the receiving device connecting to its home meeting point, receiving packets from the calling device at the meeting point channel, and redirecting the packets to the receiving device at the meeting point channel.

The present invention achieves these objects and others by providing a mobile phone related indirect communication system and a method thereof. In an aspect of the invention, a receiving device need not actively connect to the Internet at all times. The communication system may not know the precise location of the mobile phone. The mobile phone may find the nearest base station (or Internet access point), and connect to the Internet only when needed.

The above and other features and advantages of the present invention, as well as the structure and operation of various embodiments of the present invention, are described in detail below with reference to the accompanying drawings.

Additional aspects and/or advantages of the invention will be set forth in part in the description which follows and, in part, will be obvious from the description, or may be learned by practice of the invention.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. These and/or other aspects and advantages of the invention will become apparent and more readily appreciated from the following description of the embodiments, taken in conjunction with the accompanying drawing of which.

DEFINITIONS

Figure 1:
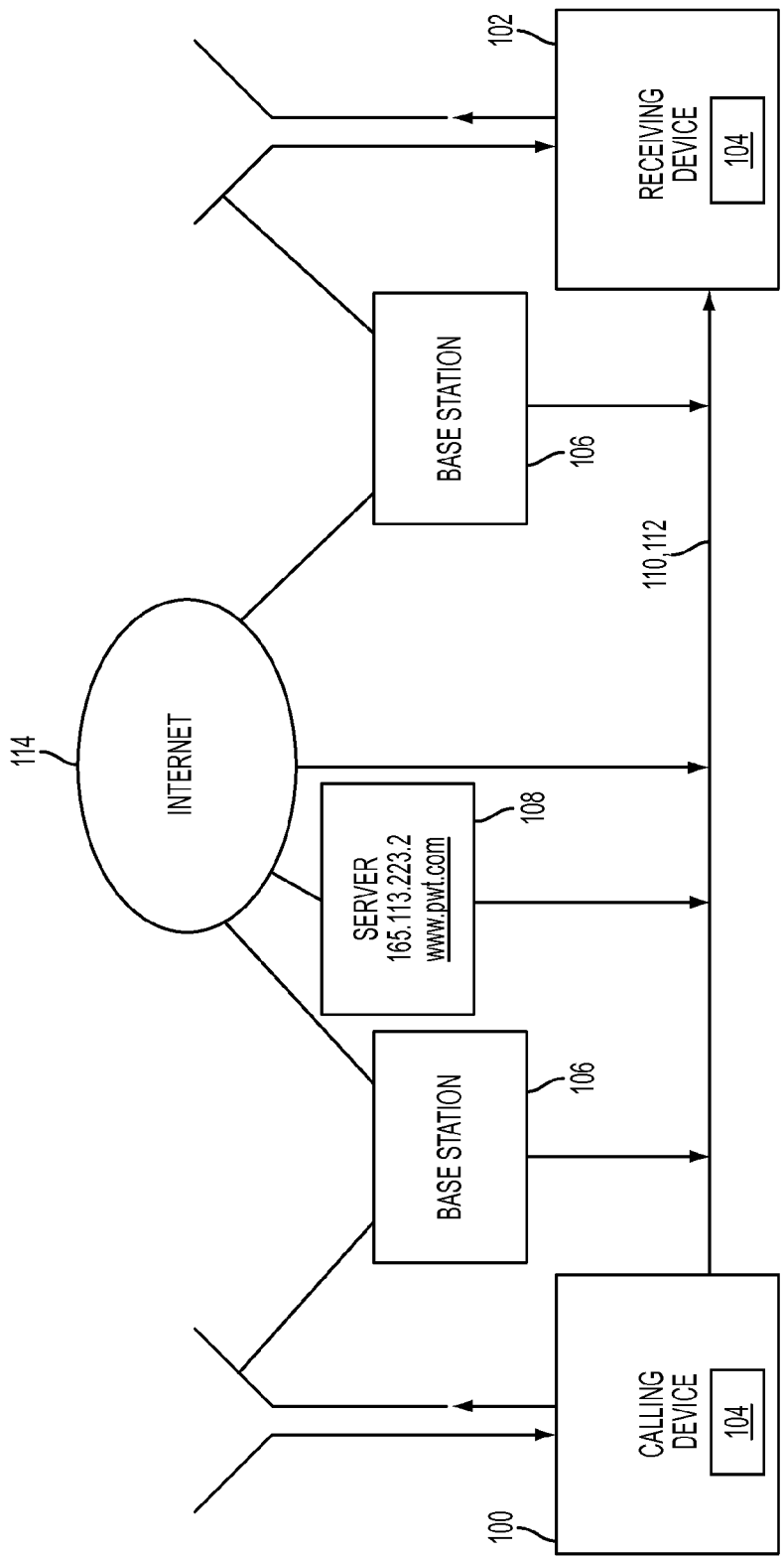
FIG. 1 is a schematic of an indirect communication system according to an embodiment of the invention.

The Internet: sometimes called the Transmission Control Protocol/Internet Protocol (TCP/IP) network, refers generally to a collection of interconnected networks that uses the TCP/IP protocol.

An Internet Protocol (IP) address refers generally to an address which is a unique number having four parts separated by dots, e.g., 165.113.223.2. Each part can have values from 0 to 255. For the TCP/IP network (or Internet), IP addresses can be used to uniquely identify a computer on the network. A newer version of IP addresses using six parts instead of four is called IPv6. A computer network in which each computer can be uniquely identified by its corresponding IP address is also called the IP network.

A Domain Name System (DNS) refers generally to an Internet service that translates domain names into IP addresses. the domain name system may be used on the Internet to translate a name such as www.pwt.com to an IP address, e.g. 165.113.223.2.

Broadband refers generally to a type of data transmission in which a single medium (wire or wireless) has the capacity to carry several channels at any one time. Also known as multiplexing. Computer network or communications between computers may be broadband, with speeds from, for example, 1 Mbps (mega bit per second) to 20 Mbps.

Session Initiation Protocol (SIP) is the Internet Engineering Task Force (IETF) protocol for VoIP and other text and multimedia sessions, like instant messaging, video, online games and other services.

A SIP Phone refers generally to a device, such as a phone, which is connected to Internet directly via a broadband modem or similar device for making and receiving calls without the involvement of a PC.

An IP Packet refers generally to packets used for Internet communication that are structured the same way to ensure compatibility in a global scale. An IP packet includes an IP header followed by a variable-length data field.

A PSTN Gateway refers generally to software installed on a machine with VoIP which allows the VoIP machine to make and receive calls from an ordinary phone (i.e. a PSTN phone).

A Base Station (BS) refers generally to a device, such as a gateway, WiFi router, GSM router, a computer or a server, with a connection to a transceiver, enabling communication with a mobile phone. The BS can also connect to the Internet for VoIP functionality.

The Global System for Mobile Communication (GSM) Network uses a series of radio transmitters, which may be Base Stations (BS), to connect mobile phones to the cellular network. The radio frequency of a Base Station, which is also called a cell, covers a certain range within a discrete area. Base Stations may be interconnected so that a mobile phone can move from one cell to another without dropping a call. A set of Base Stations is connected to a particular Base Station Controller (BSC). A set of Base Station Controllers is connected to a Mobile Switching Center (MSC). The Mobile Switching Center and its associated modules route incoming and outgoing calls, including the PSTN calls and calls to other networks.

Wireless Media or Frequency refers generally to the Radio Frequency used to communicate between a mobile phone and a Base Station.

GSM Wireless Media refers generally to the five radio frequency (RF) bands used by GSM mobile phones. The bands are:

GSM-900—using 890-915 MHz and from 1 to 124 RF channel number.

GSM-1800—using 1710-1785 MHz and 374 RF channels from 512 to 885 channel number.

GSM-850—using 824-849 MHz and from 128 to 251 channel number.

GSM-1900—using 1850-1910 MHz from 512 to 810 channel number.

GSM-400—using 890-915 MHz.

Both radio frequency and channel number are compatible with 1st generation (1G) mobile phones.

Wireless Fidelity (Wi-Fi), also known as IEEE 802.11, operates within the spectrum near 2.4 GHz, except for 802.11a, which uses 5 GHz. Different countries may have different Wi-Fi settings due to the power output requirements. By using standardized channel numbers, Radio Frequency (RF) differences can be easily detected internationally. The standard coverage of Wi-Fi is short, under a few hundred meters.

Worldwide interoperability Microway Access (WiMAX), also known as IEEE 802.16, is a standard for specific wireless access using RF between 2 to 20 GHz. The transmitting and receiving range for WiMAX, often more than 20 kilometers, is greater than that of Wi-Fi.

DETAILED DESCRIPTION OF THE PREFERRED EMBODIMENTS

It would be desirable to allow mobile phones to place and receive calls using the Internet (or a Voice over Internet Protocol network), at low cost and relatively high quality. It would further be desirable if a caller were able to let a receiving device know that someone is waiting to communicate at a meeting point on the Internet, without incurring excessive airtime charges. It would further be desirable for the receiving device to be able to connect to the meeting point as well and communicate with the calling device using Voice over Internet Protocol (VoIP), without incurring further air time charges. It would further be desirable if the caller were able to let the receiving device know that someone is waiting at a the meeting point by sending a short signal to the receiving device over the existing cellular network, to minimize expenditures for air time. It would further be desirable if the receiving device did not have to answer the short notification tone, or could hang up quickly, along with the calling device, so that airtime expenditures could be minimized, and conduct the actual communication with the calling device through the meeting point. Finally, it would be desirable if the location of the receiving device did not need to be known to the caller.

The Internet is a so-called packet-switched network. Packets are structured similarly to ensure compatibility on a global scale. An IP packet has a header followed by a variable-length data field. Among the header fields will be a Source IP, which is an address of the originating device, and a Destination IP, which is an address of the destination device. Although IP is used in this description, the invention is not limited to a particular packet format, or to IP in general. The examples herein, rather, are merely exemplary, and not meant to be limiting.

Another type of network is a circuit switched network, such as the Public Switched Telephone Network (PSTN), also known as the Plain Old Telephone System (POTS). A public switched telephone network refers generally to the national and international telephone system based on copper wires and carrying analog voice data. Telephone service carried by the public switched telephone network is often called "Plain Old Telephone Service" (POTS). Plain old telephone service is the standard telephone service that most homes use. In general, plain old telephone service is restricted to about 52 Kbps (52,000 bits per second).

A third type of network is a wireless, or radio frequency (RF), network. Wireless networks could be packet switched, like the internet, or circuit switched, like the public switched telephone network, or both.

A gateway is often used to convert packet switched data to circuit switched data, and vice versa. Thus, a gateway enables a VoIP device to make and receive calls from an ordinary phone, such as a public switched telephone network phone. A gateway refers generally to a device, either hardware or software, equipped to interface with another network that uses different protocols. A gateway may contain devices such as protocol or signal translators, for example, to provide system interoperability. A gateway may establish mutually acceptable procedures between two networks.

Voice over Internet Protocol (VoIP) refers generally to protocols, such as Session Initiation Protocol (SIP) and the International Telecommunication Union (ITU) H.323, used to carry voice signals over a packet-switched network, such as the Internet. VoIP can provide telephony capability to users on the Internet. A computer with a VoIP client (or VoIP software phone) can be used to make calls to another computer over the TCP/IP network (i.e. Internet). In general, the speaker, microphone, and the sound card of the computer can be used to talk and listen with the person at the other end. The keyboard of the computer can be used to type in the IP address or the domain name system of the receiving end so that communication can be established. The entire community using VoIP client over the TCP/IP network is generally referred to as the VoIP Network.

In a Voice over Internet Protocol communication, a voice signal received from a microphone is sampled and the samples are converted into packet payloads with a sound card by, for example, extracting the frequency content of the voice signal with a discrete Fourier transform, and forming packet payloads with the frequency data. The address of the receiver to which the packets will be addressed may be entered at a keyboard. The frequency data are converted back to voice signals at the receiver with an inverse Fourier transform using another sound card, and emitted by a speaker. Thus, VoIP can provide telephony capability to users on the Internet. The speaker and microphone could be embodied in a software phone.

Formats like Voice over Internet Protocol, which utilize the Internet to transfer information, offer the ability to communicate for a flat fee, paid to an internet service provider. A flat fee is often less expensive, given the duration or frequency of the communication, than the comparable cost of communication using a cellular phone. One drawback associated with communication over the Internet, however, is that the parties to the communication need to intend to communicate, and also participate in setting up the call by, at least, making their location known. Each party, for example, accesses the Internet separately, contacts the other party, and then commences the communication.

There is, in general, no Internet analogy to the notifying function provided by a cellular telephone service provider, in which one party dials a telephone number of the other party, and the cellular phone service provider locates the other party's phone and connects the call. The Internet, in particular, has none of the infrastructure provided by a cellular phone service provider dedicated to locating the cellular phone of the called party. It would be desirable, therefore, to be able to utilize the infrastructure possessed by the cellular phone service providers to set up a communication, by locating and notifying the called party, and then switch to, for example, communication over the Internet for the actual duration of the call.

In FIG. 1, there is shown an embodiment of an indirect communication system including a calling device 100, which may have a transceiver 104, and a receiving device 102, which may also have a transceiver 104. If a cellular network, such as a Global System for Mobile Communication (GSM) network, serves the calling device 100 and the receiving device 102, the calling device 100 and the receiving device 102 might be connected to the network by a series of base stations 106. The base stations 106 may be connected, in turn, to a mobile switching center (MSC), which is in turn connected to other networks.

Each base station 106 serves an area called a cell, and the calling device 100 or the receiving device 102, upon entering the cell, communicates with the network through that base station 106. The calling device 100 and the receiving device 102, furthermore, may be handed off from one base station 106 to another as they move from cell to cell. The base station 106 may be a personal computer (PC) with a public switched telephone network gateway, a modem, and/or switch box with the usual public switched telephone network network.

The indirect communication system may also have a meeting point server 108 for communicating with the calling device 100 and the receiving device 102, and a connection with an communication network 114. The meeting point server 108 may be a server with a public switched telephone network gateway, a modem, and/or a switch box. Either the calling device 100, the receiving device 102, or both, may be a mobile phone. The roles of the calling device 100 and the receiving device 102 may be reversed, without loss of generality.

The calling device 100 is capable of transmitting and receiving a signal 110 via the transceiver 104. The calling device 100 is connected to the base station 106 through transceiver 104. The calling device 100 is also capable of connecting to the meeting point server 108 via the transceiver 104 or the base station 106. For a minimum level of service, full Internet access between the base station 106 and the calling device 100 is not necessary. In fact, audio communication between the base station 106 and the calling device 100 is sufficient, so that the central processing unit (CPU) and/or computing power of the calling device 100 can be kept to a minimum.

As shown in FIG. 1, the calling device 100 may call the receiving device 102 by sending a signal 110 to receiving device 102. The signal 110 may be a short (one or two tone) ringing tone. The signal 110 alerts the receiving device 102 of a prospective communication with the calling device 102. In one embodiment, the calling device 100 notifies the receiving device 102 of an intention to communicate by sending the signal 110 to the receiving device 102 and hangs up, incurring no further airtime charges. In one embodiment, the calling device 100 hangs up by disconnecting from the base station 106.

There are a number of devices and methods that can be used to transmit the signal 110. The calling device 100 can send the signal 110 to the receiving device 102 over the GSM network in the traditional manner. The signal 110 can also be generated or broadcast by the transceiver 104 of the calling device 100. In an alternative embodiment the, the base station 106 can send the signal 110 to the receiving device 102. In an alternative embodiment, the meeting point server 108 can send the signal 110 to the receiving device 102.

The signal 110 could be a discrete multi-tone (DMT) signal, such as a discrete multi-tone signal having one or two tones. In one embodiment, the signal 110 includes information for the receiving device 102 identifying the location, such as the address, of the meeting point server 108. In another embodiment, the signal 110 includes information for the meeting point server 108 identifying the phone number or the address of the calling device 100 or the receiving device 102. In another embodiment, the signal 110 may include no other information at all.

In several embodiments, the signal 110 could be any analog or digital signal suitable for connecting the calling device 100 to the base station 106 or the meeting point server 108, such as a spread-spectrum signal, a time-, frequency-, or code division multiplexed signal, or a combination thereof. In one embodiment, the signal 110 is a GSM signal. The signal 110 may be directed to the receiving device 102 using the phone number assigned to the receiving device 102. In this case, the signal 110 may be the aforementioned two-tone discrete multi-tone signal, a short signal to notify the receiving device 102 of a prospective or prospective communication.

After sending the signal 110, the calling device 100 may, in general, hang up so that no further phone or airtime charges accrue. In one embodiment, the calling device 100 hangs up by disconnecting from the base station 106. The calling device 100 may then connect to the home meeting point channel of the receiving device 102 inside the meeting point server 108, and await the response of the receiving device 102. There is no need for the receiving device 102 to be connected constantly to the base station 106 or the Internet.

In one embodiment, the receiving device 102 is capable of sending and receiving a signal 112. The signal 112 could be a discrete multi-tone signal, such as a discrete multi-tone signal having two tones. In the case of direct communication between the calling device 100 and the receiving device 102, the signal 112 could be the signal 110, albeit displaced in time or space. In one embodiment, the signal 112 includes information for the calling device 100 identifying the location, such as the address, of the meeting point server 108. In another embodiment, the signal 112 includes information for the meeting point server 108 identifying the phone number or the address of the calling device 100 or the receiving device 102.

In several embodiments, the signal 112 could be any analog or digital signal suitable for connecting base station 106 or meeting point server 108 to receiving device 102, such as a spread-spectrum signal, a time-, frequency-, or code division multiplexed signal, or a combination thereof. The signal 112 could also be used for connecting the receiving device 102 to the meeting point server 108 via the transceiver 104 or the base station 106. In one embodiment, the signal 112 is a GSM signal.

The receiving device 102 may not answer the call, or it may answer the call and hang up, to minimize charges for using airtime. In one embodiment, hanging up means disconnecting from the base station 106. The calling device 100 may also hang up immediately after sending the short notification signal to receiving device 102, also to minimize charges. The signal 110, in particular, may alert receiving device 102 of the prospective communication, without necessarily carrying out the communication itself. The signal 110 may also impart identifying information of the meeting point server 108.

The receiving device 102, upon receiving the signal 110 from the calling device 100, may connect to a meeting point channel on the meeting point server 108. In one embodiment, the receiving device 102 connects to the meeting point server 108 through the base station 106. In another embodiment, the receiving device 102 may connect to the meeting point channel on the meeting point server 108 directly, such as over the Internet, and commence communication with the calling device 100. After both the calling device 100 and the receiving device 102 have connected to the meeting point server 108, communication can commence using VoIP.

The meeting point server 108 is capable of supporting a communication connection between the calling device 100 and the receiving device 102. The connection may include the signal 110 alerting the receiving device 102 of the prospective communication with the calling device 100. In this case, the receiving device 102 may form a connection with the meeting point server 108 after receiving the signal 110.

The receiving device 102, however, may not need to answer the call represented by the short, two-tone signal. Instead, the signal 110 itself may impart sufficient information for the receiving device 102 to recognize the prospect of communication with the calling device 100 at the meeting point server 108. In the alternative, the receiving device 102 may answer the call, but hang up immediately, thus minimizing airtime charges.

In one embodiment, hanging up may mean disconnecting from the base station 106. Therefore, an advantage of this embodiment is that the indirect communication system allows any mobile device to communicate to another device through meeting point server 108, such as by Voice over Internet Protocol (VoIP), while avoiding the use of airtime.

The meeting point server 108 is also capable of supporting a connection between the calling device 100 and a plurality of receiving devices 102, such as during a conference call. In this case, the meeting point server 108 would copy each packet received from the calling device 100 and redirect the copies to the individual receiving devices 102. Each of the receiving devices 102 would have formed a connection with the meeting point server 108 after receiving their respective signals 110.

The receiving devices 102 may not, however, have answered the call, or else, if they did answer it, they may have hung up immediately. Thus, each of the receiving devices 102 would hear the calling device 100, but without incurring further airtime charges. Therefore, an advantage of the embodiment is that the indirect communication system allows the calling device 100 to communicate with a plurality of receiving devices 102 through meeting point server 108, such as by Voice over Internet Protocol (VoIP), while avoiding the use of airtime.

The meeting point server 108 may be connected to other servers using the communication network 114. In one embodiment, the communication network 114 may be an Internet communication network. In another embodiment, the communication network 114 may be an Intranet communication network, such as a company's proprietary network.

The meeting point server 108 may have an identifier, such as an IP address on the communication network 114. The address could be a unique number having four or six parts, separated by dots, e.g. 165.113.223.2. The address can be used to identify meeting point server 108 uniquely on the communication network 114. The meeting point server 108 may also have a domain name, such as www.pwt.com. The domain name may be convertible into an IP address by a domain name system.

In one embodiment, such as VoIP applications, the meeting point server 108 may simply be a personal computer with an IP address such as 165.113.223.2, or a domain name system name such as a web site address (e.g. www.voip mobile-phone.com or www.pwt.com). In one embodiment, the base station 106 connecting the calling device 100 and/or the receiving device 102 can also be used as the meeting point server 108. Many meeting points (locations or channels) can be set up inside the meeting point server 108 for the calling device 100 and the receiving device 102 to meet and talk.

In one embodiment, the calling device 100 may have a phone number 1111. The calling device 100 places a call to the receiving device 102, which may have a phone number 2222. The calling device 100 calls the receiving device 102 by sending the signal 110 in the form of a short ringing tone, possibly including the phone number 2222 of the receiving device 102, to the receiving device 102.

After sending the signal 110, the calling device 100 connects to the meeting point server 108, which may have an IP address such as 165.113.223.2. The connection with the meeting point server 108 may be via the appropriate base station 106. The meeting point server 108 may set up a communication channel with the receiving device 102 on the meeting point server 108 and direct the calling device 100 to that channel.

In one embodiment, the only information held in common by the calling device 100, the meeting point server 108, and the receiving device 102 is the phone number of the receiving device 102. In this embodiment, the meeting point channel on the meeting point server 108 may have an address formed by combining the phone number of the receiving device 102, i.e. 2222, with the IP address of the meeting point server 108, i.e. 165.113.223.2. Thus, the address of the meeting point channel might be of the form 2222@165.113.223.2. The number 2222 is derived from the number of the receiving device 102, while the IP address 165.113.223.2 is derived from the address of the meeting point server 108.

In one embodiment, the meeting point channel has been prearranged, and both the receiving device 102 and the calling device 100 are aware of the address of the meeting point channel on the meeting point server 108. In this embodiment, when the receiving device 102 with number 2222 receives the short ringing tone, the receiving device 102 will go to the predetermined, or default, meeting location represented by 2222@165.113.223.2, to commence communication with the calling device 100. In this embodiment, the receiving device with number 2222 may own the channel represented by 2222@165.113.223.2, and ownership of meeting point channel is established thereby.

In another embodiment, the receiving device 102 may only be aware of the IP address of the meeting point server 108 along with, of course, its own phone number. In this embodiment, there may be a prearranged protocol between the calling device 100 and a receiving device 102 in which it is understood that sending the signal 110 to the receiving device 102 indicates that there is a meeting point channel waiting on the meeting point server 108. It may further be understood that the address of the meeting point channel will be formed from the phone number of the receiving device 102 and the IP address of the meeting point server 108.

In this embodiment, when the receiving device 102 with a phone number 2222 receives the short ringing tone, the receiving device 102 will perform home calling. In this embodiment, the receiving device 102 will go to the meeting point server 108, where the meeting point server 108 will transfer the receiving device 102 to its home meeting point channel represented by 2222@165.113.223.2. The receiving device 102 will then commence communication with the calling device 100. Thus, the receiving device 102 will be able decipher the address of the meeting point channel from its own phone number and an address of the meeting point server 108.

In yet another embodiment, the signal 110 may include tones representative of the address of the meeting point channel on the meeting point server 108. In this embodiment, receiving device 102 may be unaware of the address of the meeting point server 108. In this embodiment, rather, the receiving device 102 may be able to interpret the tones of the signal 110 to decipher the address of the meeting point channel on the meeting point server 108.

It may be possible, furthermore, for the receiving device 102 to decipher the address of the meeting point channel without answering the call represented by the signal 110. This may be the case if, for example, the receiving device 102 has "caller ID," or an analogous function in which the telephone number or other information of the calling device 100 are represented on a display of the receiving device 102. In the alternative, the receiving device 102 may answer the signal 110, and remain connected to the calling device 100 via the signal 110 long enough to receive the information representing the address of the meeting point channel on the meeting point server 108, after which the receiving device 102 will hang up.

The calling device 100 may need to know the number of the receiving device 102, and both the calling device 100 and the receiving device 102 may need to know the corresponding IP address of the gateway or the meeting point server 108. The calling device 100 can make the calls by a click of the "VoIP Call" button. For the receiving device 102, a "VoIP Accept" button will be used to receive the call.

In one embodiment, the calling format used with a dedicated mobile phone handset, or a mobile phone with a built-in function to store the gateway (or MPS) IP address, is the number of the receiving device, such as 2222. In this embodiment, pressing, for example, a "VoIP Call" button calls the number of the receiving device. There is no need to type in the IP address explicitly since the IP address is stored inside the phone. The indirect meeting point channel (IMPC), such as 2222@165.113.223.2, can be established automatically after the short ringing tone. Therefore, only the receiving device number is needed to be known by the user.

In one embodiment, a calling format for a mobile phone without a built-in function to store the gateway IP address may be 2222@165.113.223.2. After pressing the "VoIP Call" button, the system will send a short ringing tone to the receiving device number 2222 and set up the indirect meeting point channel as 2222@165.113.223.2.

In one embodiment, the channel 2222@165.113.223.2 may be entered as two separate items. The number of the receiving device 102, e.g. 2222, is entered in the number field. The IP address, such as 165.113.223.2, is entered in, e.g. the gateway field. This calling format can also be used when the gateway IP address is somewhere on the Internet, and is different from the default IP address, e.g. 165.113.223.2. In this case, a transfer function from the gateway IP to the default IP address may be provided.

Mobile phone calls can also be made when no default gateway or default IP address is available at all. Instead, the base station 106 or any PC with VoIP on the Internet can be used as the meeting point server 108. In this case, the calling device 100 should have the ability to send a short ringing tone and transmit the meeting point IP address to the receiving device 102. This allows an indirect meeting point channel to be established without the involvement of a default gateway.

Note that by having a default gateway such as the meeting point server 108, the short signal (or ringing tone) can be sent by the gateway promptly and uniquely. Without a default gateway, the calling device 100 would need to send the meeting point information to the receiving device 102, although the software inside the mobile phone can program this.

After the calling device 100 sends the signal 110 to the receiving device 102 indicating that a meeting point channel has been established on the meeting point server 108, the calling device 100 connects to the meeting point channel as well.

In one embodiment, a meeting point channel and a gateway is dedicated on the server. In this embodiment, the calling device 100 connects to the server and the server sends the signal 110 to the receiving device 102 indicating that a meeting point channel has been established on the meeting point server 108. In one embodiment, the calling device 100 will be transferred to the meeting point channel address. The meeting point channel address may be in the form of the phone number of the receiving device 102 and an address of the meeting point server 108, as discussed above. In one embodiment, the meeting point server 108 may provide music or other entertainment for attendees of the meeting while they wait for the other attendees to arrive.

After receiving the signal 110, the receiving device 102 will connect with the meeting point channel at the meeting point server 108 as well, in order to communicate with the calling device 100. If the receiving device 102 arrives at the meeting point channel before the calling device 100, the receiving device 102 may wait for the calling device 100. In one embodiment, the meeting point channel will be "owned" by the receiving device 102. This embodiment establishes ownership of the meeting point channel and may offer better control and avoid confusion.

In one embodiment, the calling device 100 or the receiving device 102 may set up the meeting point channel on the meeting point server 108 by calling its own number. In this embodiment, the meeting point server 108 will set up a meeting point channel with an address in the form of the phone number of the calling device 100 or the receiving device 102 combined with an address of the meeting point server 108 itself. Setting up a meeting point channel by calling its own phone number may be referred to as "home calling." In one embodiment, the number dialed by the calling device 100 or the receiving device 102 includes a prefix and an extension.

In one embodiment, home calling is operable both nationally and internationally, thus circumventing barriers posed by incompatible methods of caller ID transmission. In one embodiment, home calling dispenses with the need for alternative notification methods, such as short message service (SMS) messages. In one embodiment home calling is operable for a calling device 100 served by a communication network that is incompatible with that serving receiving device 102. In this embodiment, for example, the signal 110 will indicate to the receiving device 102 that someone is waiting to talk even if the receiving device 102 is on a network that is incompatible with the calling device 100.

In one embodiment, after sending the signal 110, the calling device 100 and the receiving device 102 agree on a fixed meeting point channel on the meeting point server 108. An address of the fixed meeting point channel may have a specific format, such as a number at the IP address of the meeting point server 108. In one embodiment, every prospective participant of the call must be aware of the address of the fixed meeting point channel.

In another embodiment, after sending the signal 110, the meeting point server 108 may arrange for both the calling device 100 and a receiving device 102 to connect to an unoccupied meeting point channel. In this embodiment, the meeting point server 108 can transfer the calling device 102 to the unoccupied meeting point channel when the calling device 102 contacts the meeting point server 108. For this embodiment, the meeting point server may need to know an identification number of the receiving device 102, such as the phone number of the receiving device 102, so that the meeting point server 108 can also transfer the receiving device 102 to the correct meeting point channel where the calling device 100 is waiting.

In another embodiment, a substitution number is associated with each number registered to the meeting point server 108. In this embodiment, after sending the signal 110, a meeting point channel is generated using the substitution number for the number of the receiving device 102. After receiving the signal 110, the receiving device 102 calls the substitution number to meet the calling device 100 and communicate. In this embodiment, each device will need to be aware of two numbers, the substitution number and its own phone number.

In one embodiment, the owner of the meeting point channel, i.e., the receiving device 102, may have the right to close the meeting point channel at any time. In another embodiment, the owner of the meeting point channel, i.e. the receiving device 102, may be allowed to ask all other devices connected to the meeting point channel to hang up.

In the alternative, the receiving device 102 may decline the communication, in which case no further communication takes place between calling device 100 and receiving device 102. In a further alternative, receiving device 102 could respond by counter-offering an alternate meeting point channel, connecting thereto and awaiting the response of calling device 100. If calling device 100 accepts the counter-offer, and connects to the alternate meeting point channel, communication commences with receiving device 102 as well.

The transceiver 104, base station 106, or meeting point server 108 are all capable of transmitting the signal 110 received by receiving device 102. The signal 110 may be a ringing tone generated by a GSM network, or it may be generated by the base station to which the calling device 100 is currently tethered, a computer, a public switched telephone network gateway, a modem, or a switch box for use with the public switched telephone network.

If the meeting point server 108 is used to generate the short signal ringing tone, the ringing tone can also be generated with a public switched telephone network gateway, a modem, or a switch box for use with the public switched telephone network. Finally, the short signal ringing tone can be generated by a transceiver or an antenna associated with the indirect communication system.

Figure 2:
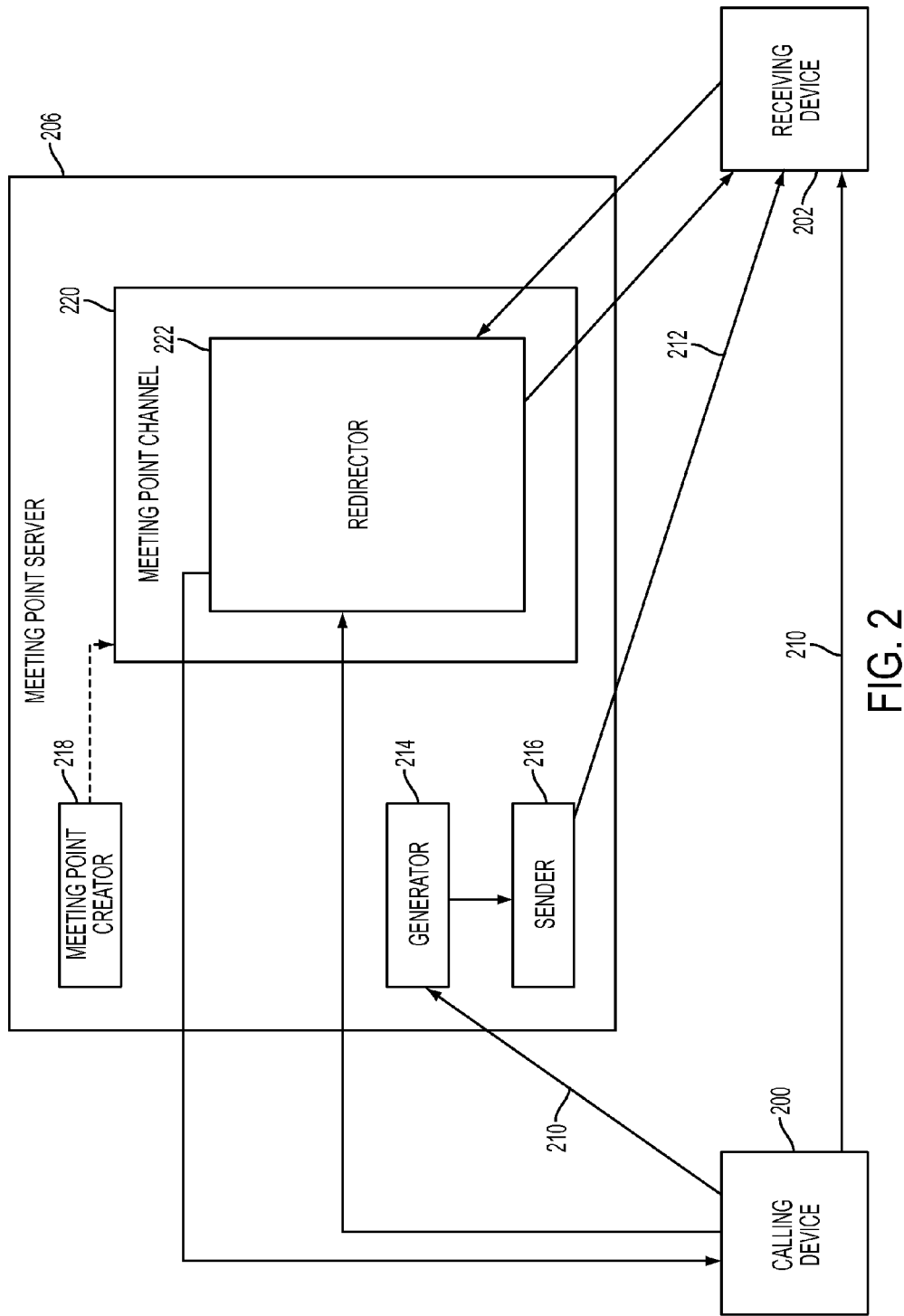
FIG. 2 is schematic of a meeting point server for use with an embodiment of the invention.

As shown in FIG. 2, the meeting point server 206 included with the indirect communication system may include a generator 214, a sender 216, a meeting point creator 218, a meeting point channel 220, and a redirector 222. The generator 214 generates a signal 212 in response to an instruction from a calling device 200. The generated signal 212 is a two-ring ring tone or a short signal. The sender 216 is a notifier notifying a receiving device 202, which may be a mobile phone, of a prospective communication in response to an instruction from a calling device 200, which may also be a mobile phone. If the calling device 200 is a mobile phone, the calling device 200 may reduce airtime charges by using a generated signal to alert the receiving device 202 of a prospective communication, but conducting the actual communication elsewhere.

The meeting point creator 218 generates the meeting point channel 220 in response to the instruction from calling device 200. The meeting point channel 220 may be created after the calling device 200 has established connection with the meeting point server 208. The establishment of meeting point channel 220 on the server enables signal 210 from the calling device 200 and signal 212 from the receiving device 202 to meet at meeting point channel 220 and form a communication path between the calling device 200 and the receiving device 202 through the meeting point channel 220.

The communication, however, may not be directly from calling device 200 to receiving device 202. Calling device 200 and receiving device 202, rather, each communicate separately with meeting point channel 220, and meeting point channel 220 redirects their respective communications to the appropriate destinations. Therefore, airtime minutes may be reduced by communicating through meeting point channel 220, such as over the Internet using VoIP, rather than over the air.

The meeting point channel 220 may include a redirector 222. The redirector is capable of receiving converted Voice over Internet packets from the calling device 200 and redirecting the Voice over Internet packets to the receiving device 202, and vice versa. The Voice over Internet packets are sent directly to the meeting point channel 220 from either the calling device 200 or the receiving device 202. The VoIP packets are then redirected to the destination device by changing the destination address on packet to the address of either the calling device 200 or receiving device 202, as appropriate. The roles of the calling device 200 and the receiving device 202 may be reversed, without loss of generality.

Figure 3A:
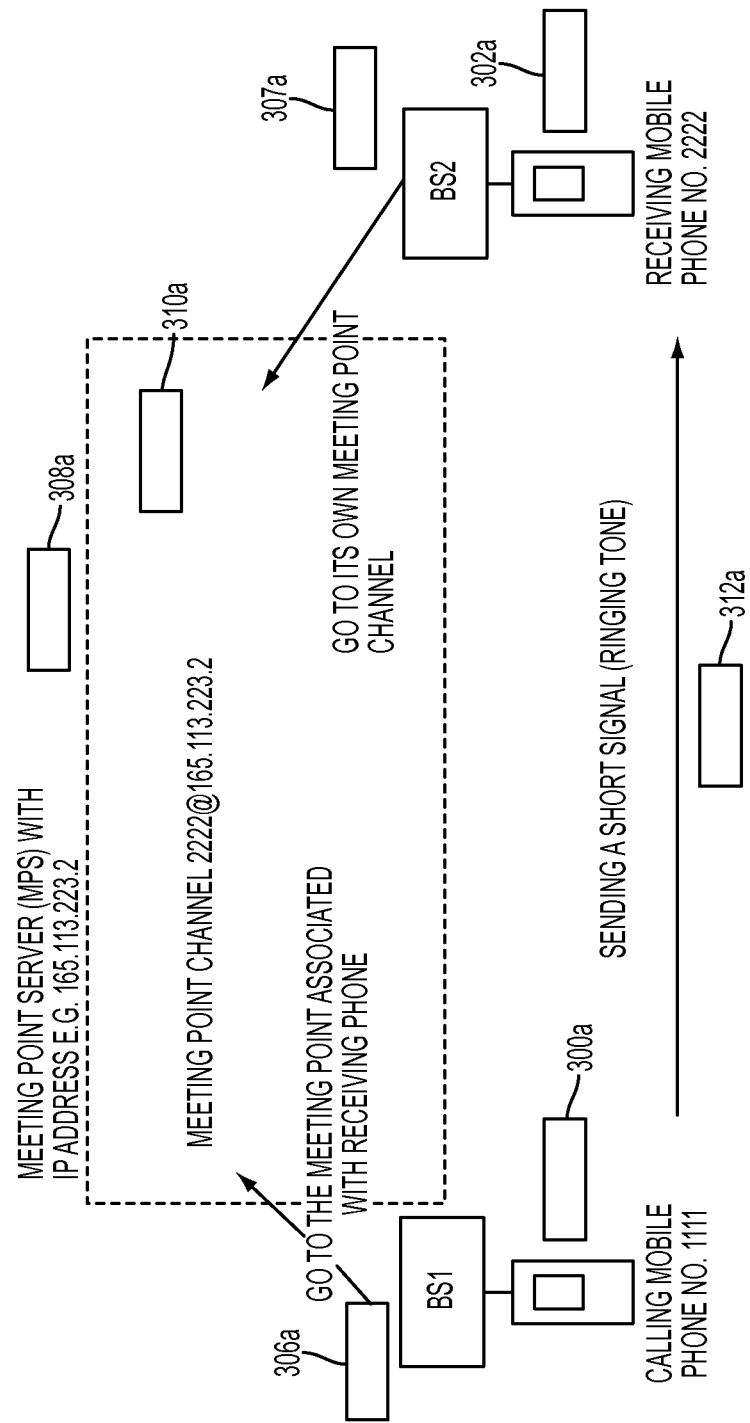
FIG. 3A is schematic of an indirect communication system according to an embodiment of the invention.

In another embodiment, as shown in FIG. 3A, an indirect communication system may include a meeting point server 308a, which is capable of receiving a communication from a calling device 300a or a receiving device 302a via base stations 306a and 307a. Either the calling device 300a or the receiving device 302a, or both, may be a mobile phone.

The calling device 300a may have a phone number 1111. The calling device 300a places a call to the receiving device 302a, which may have a phone number 2222. In one embodiment, the calling device 300a calls the receiving device 302a by sending the signal 312a in the form of a short ringing tone, the signal 312a may include no information or no instructions such as a caller ID of the calling device 300a.

After sending the signal 312a, the calling device 300a connects to the meeting point server 308a, which may have an IP address such as 165.113.223.2. The connection with the meeting point server 308a may be via the appropriate base station 306a. In this embodiment, the meeting point server 308a may set up a communication channel with the receiving device 302a dynamically and putting the calling device in that channel waiting for the receiving device 302a. The meeting point channel may be 2222@165.113.223.2, where the first number 2222, in this case, may be used to identify the receiving device. In the case of no information available from the signal 312a, the number of the receiving device can be used to complete the connection.

After the receiving device 302a with a phone number 2222 receives the short ringing tone, the receiving device 302a may make a call with its own number such as 2222@165.113.223.2. By direct dialing this call using the receiving device will connect the receiving device to the meeting point server 308a and transfer to the meeting point channel 2222@165.113.223.2, to commence communication with the calling device 300a. Dialing its own number is called home calling. In this embodiment, the receiving device 302a is just like to go home and meeting someone.

In another embodiment, the calling device 300a making a call to the receiving device by a direct dialing 2222@165.113.223.2. This action connects the calling device to the meeting point server 308a by identifying the IP address 165.113.223.2. The server 308a may then send the signal 312a to the receiving device 302a with number 2222. After sending the signal, the server 308a generates the meeting point 2222@165.113.223.2 and put the receiving device into this channel waiting for the receiving device to make a home calling.

Alternatively and depending on the network of the base station 307a, the calling device 300a may capture the voice data and converts it to an "Outgoing VoIP Packet". In this embodiment, the job of the base station 307a is just passing the packet to the meeting point channel inside the meeting point server.

In another embodiment, when both calling and receiving device have the meeting point server 308a IP address stored as parameter or built-in function, the operation of home calling is the same as dialing its own number on the device.

In another embodiment, the receiving device 2222 may own the meeting point channel 2222@165.113.223.2 inside the server 308a. Establishing ownership of meeting point channel may allow the owner to perform administration work such as close the meeting point channel at any time forcing people inside the channel to hang up.

Figure 3B:
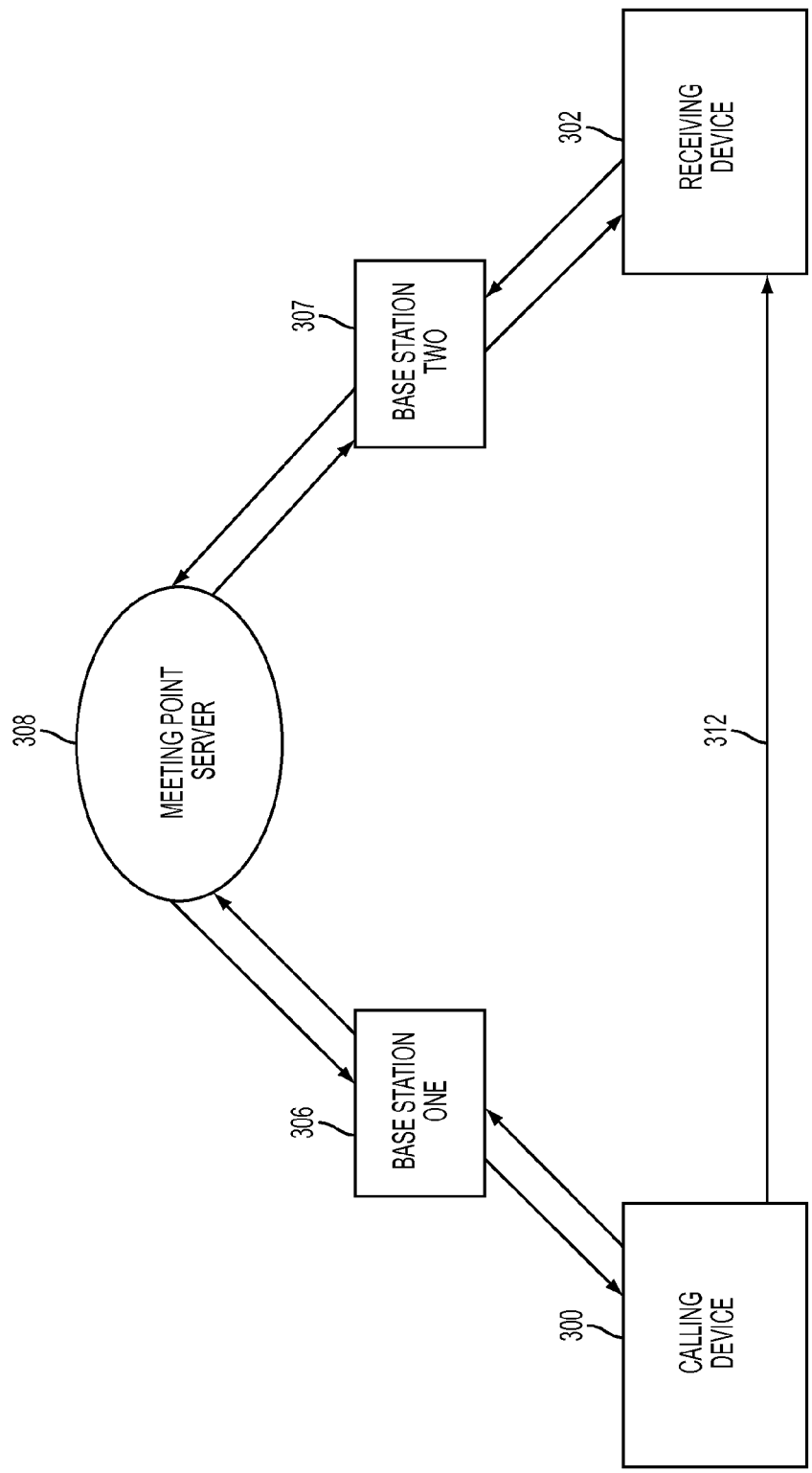
FIG. 3B is schematic of an indirect communication system according to an embodiment of the invention.

In another embodiment, as shown in FIG. 3B, an indirect communication system may include a meeting point server 308, which is capable of receiving a communication from a calling device 300 or a receiving device 302 via base stations 306 and 307. Either the calling device 300 or the receiving device 302, or both, may be a mobile phone.

Both the calling device 300 and a receiving device 302 may connect to the meeting point server 308 after a signal 312 is sent by the calling device 300 to the receiving device 302. In this embodiment, the signal 312 may include information or instructions such as a caller ID of the calling device 300, an address of the meeting point server 308 or an alternate meeting point, or a callback number.

After the calling device 300 and the receiving device 302 are connected to the meeting point server 308, the calling device 300 and a receiving device 302 may begin sending information meant for their opposite party to the meeting point server 308. The meeting point server 308 may then redirect the communication to the respective calling device 300 or receiving device 302. Therefore, airtime minutes may be reduced by enabling both calling device 300 and receiving device 302 to communicate with each other using VoIP, through meeting point server 308, thereby lowering the cost of communicating and increasing the quality of phone communication.

In one embodiment, redirection works as follows. The calling device 300 sends a short ringing tone to the receiving device 302, and connects to the base station 306. The base station 306 and may have an IP address such as BS1_IP. The details of the address BS1_IP may be known by a calling device 300 when the calling device 300 connects to the base station 306. After receiving the short ringing tone, the receiving device 302 connects to the base station 307. The base station 307 may have an IP address such as BS2_P.

The meeting point server 308 may be located on the Internet at an IP address such as 165.113.223.2. The IP address of the meeting point server 308 may be known to the calling device 300, or the base station 306, or both. The calling device 300 connects to the base station 306 with the IP address BS1_IP. The base station 306 with the IP address BS1_IP captures the voice data from the calling device 300 and converts it to an "Outgoing VoIP Packet". The outgoing IP packet has a header, according to which the outgoing IP packet is being sent from the base station 306 at the IP address BS1_IP to the address of the meeting point server 308 (i.e. 165.113.223.2). The base station 306 at the IP address BS1_IP sends this packet to the meeting point server 308.

When the outgoing packet from the base station 306 at the IP address BS1_IP arrives at the meeting point server 308, the meeting point server 308 changes the destination address in the header of the IP packet. The meeting point server 308 changes the destination address from 165.113.223.2, which is the address of the meeting point server 308, to BS2_IP, which is the IP address of the base station 307 associated with receiving device 302. The meeting point server 308 then sends the IP packet to the base station 307.

When the base station 307 with the address BS2_IP receives the packet, it will consider it to be an incoming VoIP packet and pass the voice content to the receiving device 302. In this way, communication from the calling device 300 to the receiving device 302 is established. Similarly, communication can be established from the receiving device 302 to the calling device 300, i.e. in the reverse direction, by changing the destination address of each IP packet from 165.113.223.2, the address of the meeting point server 308, to BS1_IP, the IP address of the base station 306 associated with calling device 300. The roles of the calling device 300 and the receiving device 302 may be reversed, without loss of generality.

Figure 4:
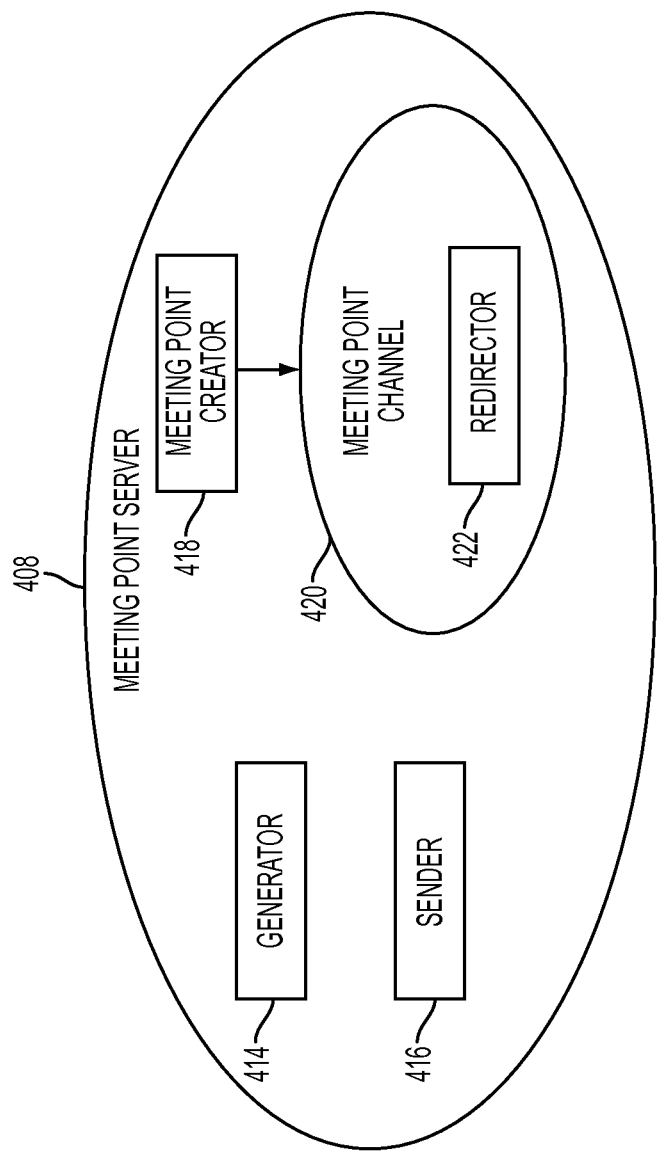
FIG. 4 is a schematic of a meeting point server for use with an embodiment of the invention.

As shown in FIG. 4, the meeting point server 408 included with the indirect communication system may include a generator 414, a sender 416, a meeting point creator 418, a meeting point channel 420, and a redirector 422. The generator 414 generates a signal in response to an instruction from a calling device. The generated signal is a two-ring ring tone or a short signal. The sender 416 is a notifier notifying a receiving device of a prospective communication in response to an instruction from a calling device. Therefore, if the calling device is a mobile phone, then the calling device will reduce airtime charges by using a generated signal to alert the receiving device of a prospective communication.

The meeting point creator 418 generates the meeting point channel 420 in response to the instruction from the calling device. The meeting point channel 420 may be created after the calling device has established connection with the meeting point server 408. The establishment of meeting point channel 420 on the meeting point server 408 enables the calling device and the receiving device to meet at the meeting point channel 420 and communicate with each other, without using further airtime.

Figure 5:
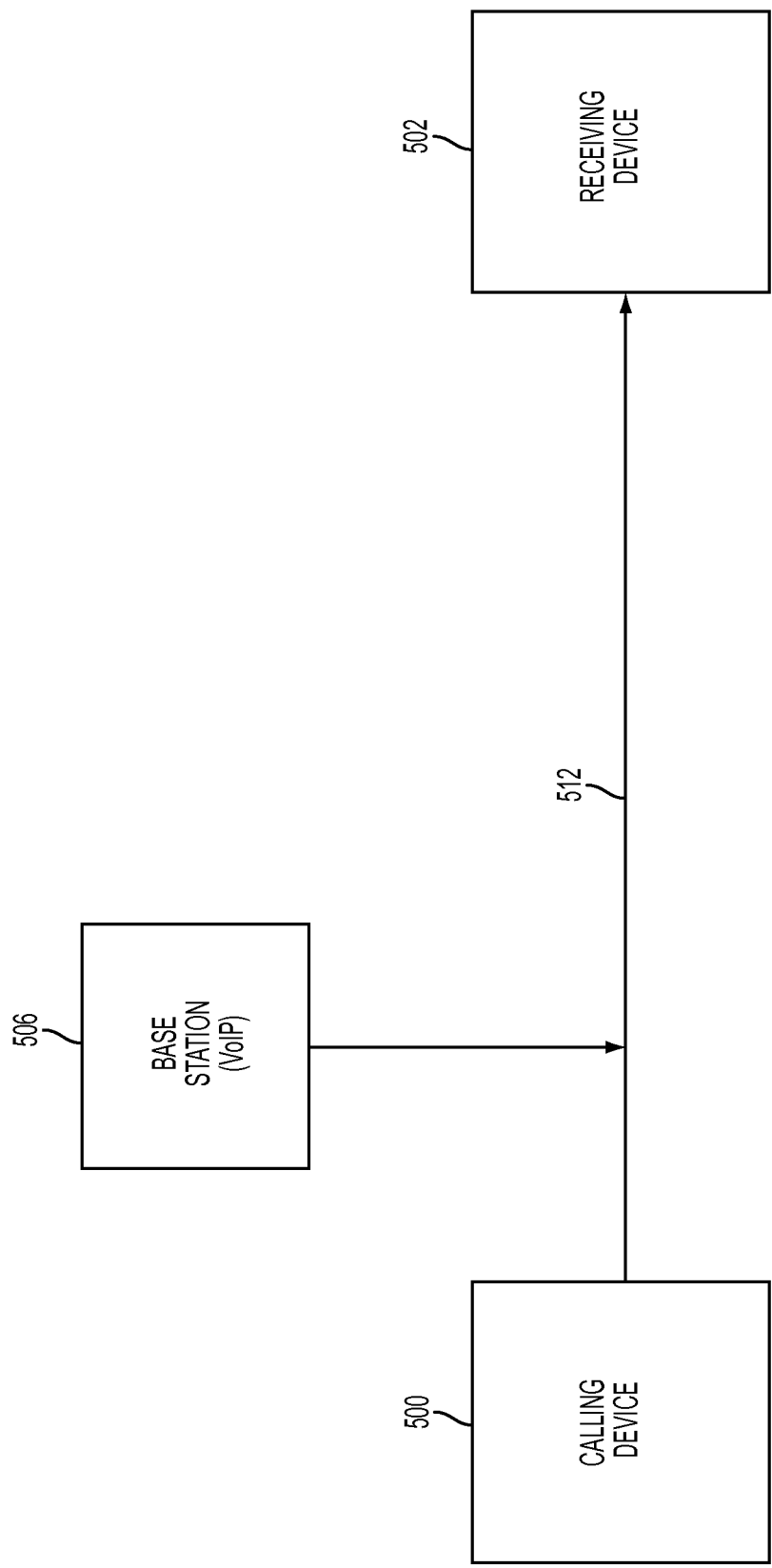
FIG. 5 is a schematic of a base station for use with an embodiment of the invention.

In FIG. 5, there is shown a base station 506 included in an indirect communication system that may also include a calling device 500, which may be a mobile phone, and a receiving device 502, which may also be a mobile phone, as well as other devices. The base station 506 may be a computer with a transceiver, and a connection to either calling device 500 or receiving device 502, and is equipped with VoIP capability, a public switched telephone network gateway, a modem, and/or a switch box for connection to the public switched telephone network. The base station 506 is capable of transmitting a signal 512 upon receiving instructions from the calling device 500. The signal 512 is capable of notifying the receiving device 502 of a prospective communication. The roles of the calling device 500 and the receiving device 502 may be reversed, without loss of generality.

Figure 6:
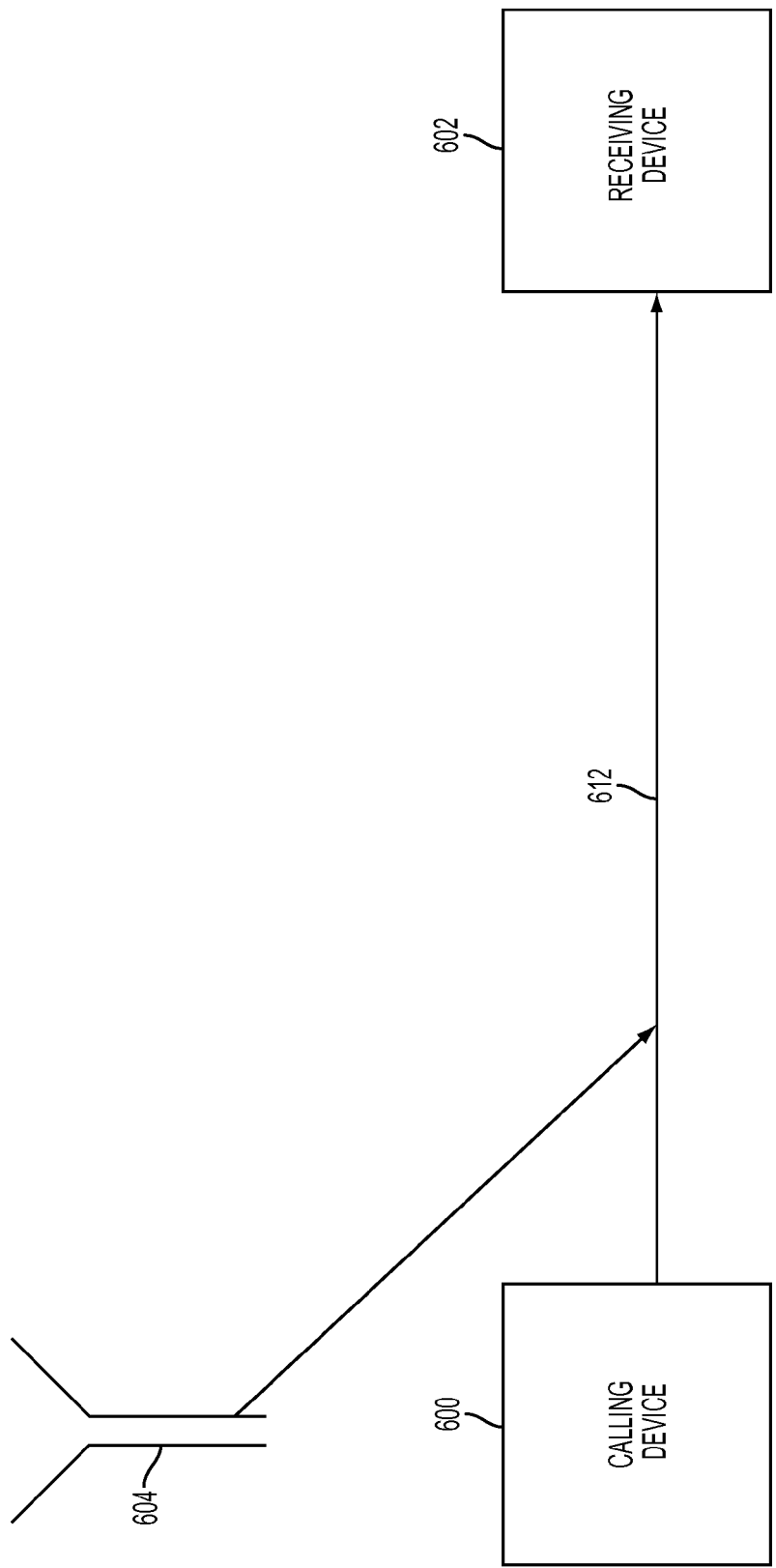
FIG. 6 is a schematic of a transceiver for use with an embodiment of the invention.

In FIG. 6, there is shown a transceiver 604 included in an indirect communication system that may also include a calling device 600, which may be a mobile phone, and a receiving device 602, which may also be a mobile phone, as well as, other devices. The transceiver 604, represented by an antenna, is capable of transmitting a signal 612 upon instructions from the calling device 600. The signal 612 is capable of notifying the receiving device 602 of a prospective communication via broadcast. The roles of the calling device 600 and the receiving device 602 may be reversed, without loss of generality.

Figure 7:
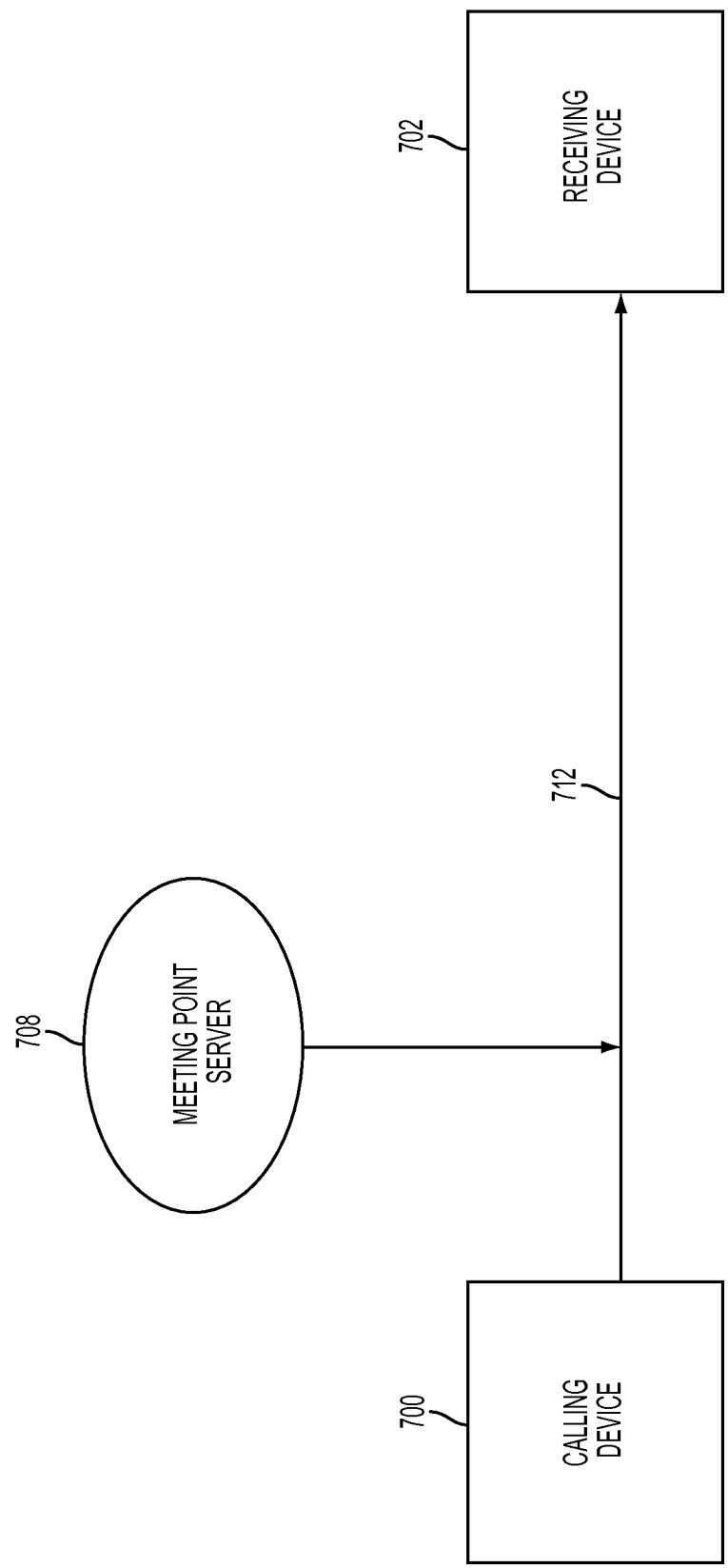
FIG. 7 is a schematic of a meeting point server for use with an embodiment of the invention.

In FIG. 7, there is shown a meeting point server 708 included in an indirect communication system that may also include a calling device 700, which may be a mobile phone, and a receiving device 702, which may also be a mobile phone, as well as other devices. The meeting point server 708 is for example a computer on the Internet, having an address or a domain name, or a base station. The address may be fixed to avoid confusing it with an address of a base station. In the alternative, the domain name of the meeting point server 708 could be kept constant, while the address is allowed to change.

The meeting point server 708 may also be equipped with a public switched telephone network gateway, a modem, and/or a switch box related to the meeting point server 708. The meeting point server 708 is capable of transmitting the signal 712. The signal 712 is capable of notifying the receiving device 702 of a prospective communication. The meeting point server 708 re-directs packets sent to it from the calling device 700 to the receiving device 702, and vice versa. The roles of the calling device 700 and the receiving device 702 may be reversed, without loss of generality.

Figure 8:
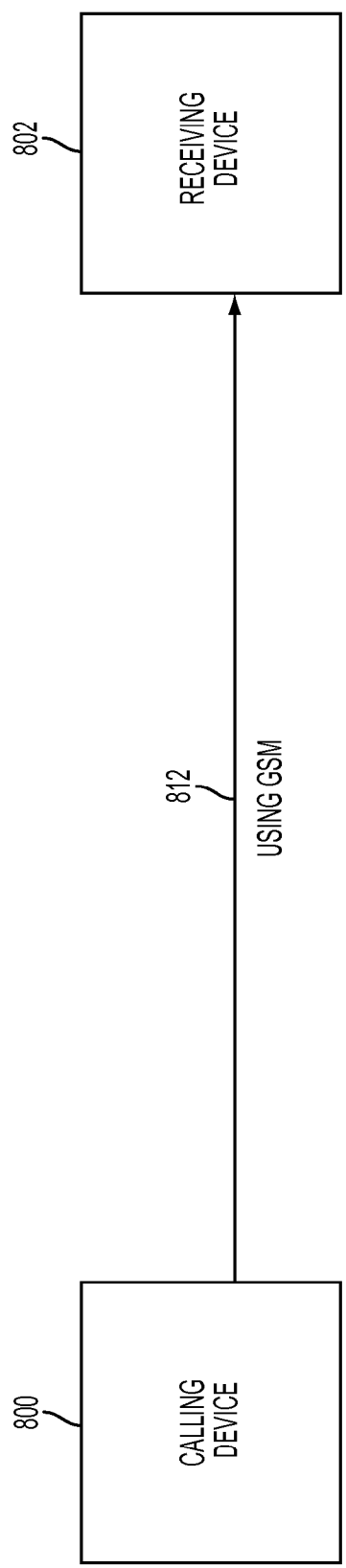
FIG. 8 is a schematic of a notifying signal for use with an embodiment of the invention.

In FIG. 8, there is shown a calling device 800 included in an indirect communication system that may also include a receiving device 802, which may be a mobile phone, as well as other devices. The calling device 800 can generate a signal 812. The generated signal 812 is received via a Global Systems for Mobile Communication (GSM) network. Calling device 800 could be provided with hardware or software for transmitting the short, two ring, signal, connecting to the Internet, and setting up a meeting point channel, either directly or through a base station or the public switched telephone network.

The software could be downloaded to the calling device 800 and a receiving device 802, which may be also be a mobile phone, over the cellular network. In this case the calling device 800 and the receiving device 802 may be programmable and controllable by a third-party to download the software. The software may include a menu, an interface, radio boxes, check boxes, and option press buttons. The calling device 800 and receiving device 802 may also have a switch to switch to the meeting point channel after sending the short, two-tone signal over the cellular network.

The calling device 800 and the receiving device 802 may have a built-in function to store the address of the meeting point server, such as a default gateway. In that case there would be no need to type the address explicitly. Only the phone number of the receiving device 802 would be necessary in order to form the address of the meeting point server. The roles of the calling device 800 and the receiving device 802 may be reversed, without loss of generality.

Figure 9:
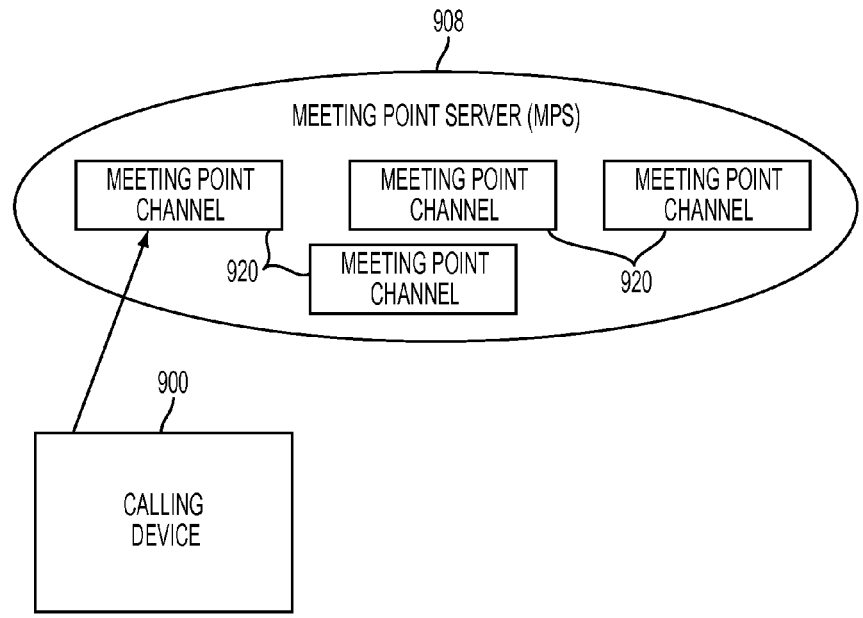
FIG. 9 is a schematic of a meeting point server for use with an embodiment of the invention.

As shown in FIG. 9, the meeting point server 908 includes a meeting point channel 920. A calling device 900, which may be a mobile phone, calls the meeting point server 908 to set up a call to a receiving device, which may also be a mobile phone. The meeting point server 908 may have a plurality of meeting point channels 920 for multiple communications. The meeting point channel 920 is identified by an address of a receiving device and either an Internet Protocol address or a Domain Name System name. A typical meeting point channel 920 identification channel may be in the form of an email address.

If the phone number of a receiving device is 22222 and either the Internet Protocol address is 165.113.223.2 or the Domain Name System name is www.mps_VoIP.com, then the channel location may be 22222@165.113.223.2 or 22222@www.mps_VoIPcom. Therefore, a receiving device would have the information necessary to connect to the channel 920 after connecting to the meeting point server 908, which would then complete the call to the calling device 900.

Figure 10:
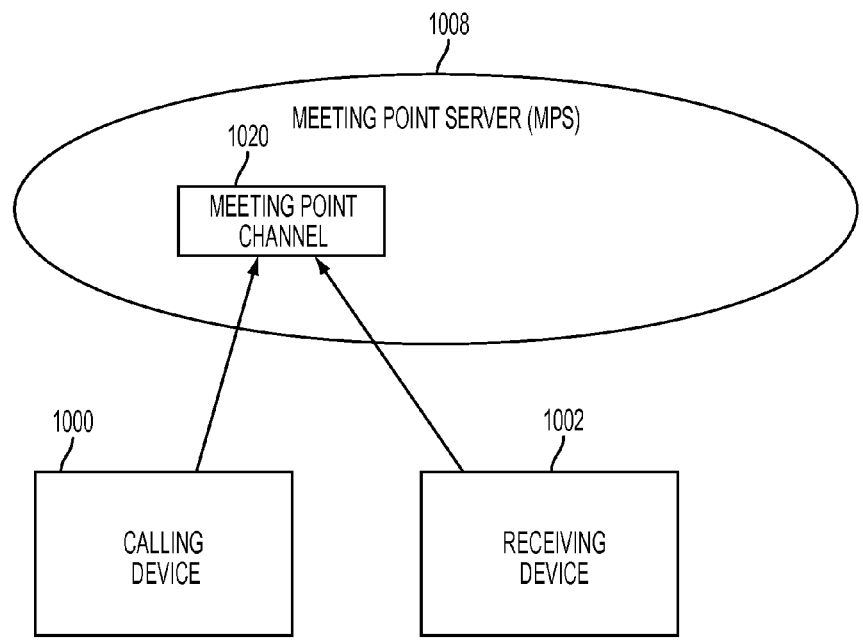
FIG. 10 is a schematic of a meeting point server for use with an embodiment of the invention.

In FIG. 10, there is shown a meeting point server 1008 having a meeting point channel 1020. A calling device 1000, which may be a mobile phone, and a receiving device 1002, which may also be a mobile phone, meet in the meeting point channel 1020, after the meeting point channel 1020 is created in the meeting point server 1008. The roles of the calling device 1000 and the receiving device 1002 may be reversed, without loss of generality.

Figure 11:
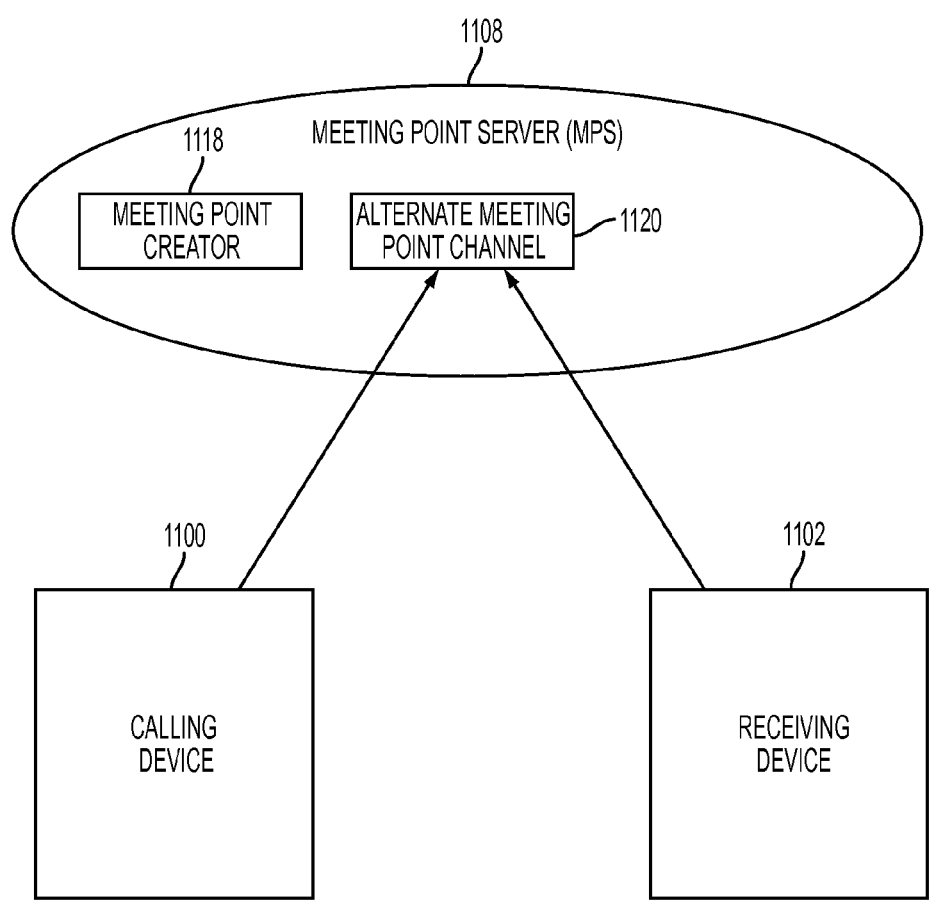
FIG. 11 is a schematic of a meeting point server for use with an embodiment of the invention.

In FIG. 11, there is shown a meeting point server 1108 including a meeting point creator 1118 and an alternate meeting point channel 1120. The alternate meeting point channel 1120 is created when a receiving device 1102 selects "alternative meeting point location". The meeting point creator 1118 creates the alternate meeting point channel 1120. Sometimes, the alternative meeting point channel 1120 may be in another meeting point server somewhere on the Internet.

The alternative meeting point channel 1120 receives a connection from a calling device 1100, which may be a mobile phone, and a receiving device 1102, which may also be a mobile phone. Therefore, an advantage of the alternative meeting point channel 1120 is that a communication can be established at any channel in the meeting point server 1108. The roles of the calling device 1100 and the receiving device 1102 may be reversed, without loss of generality.

Figure 12:
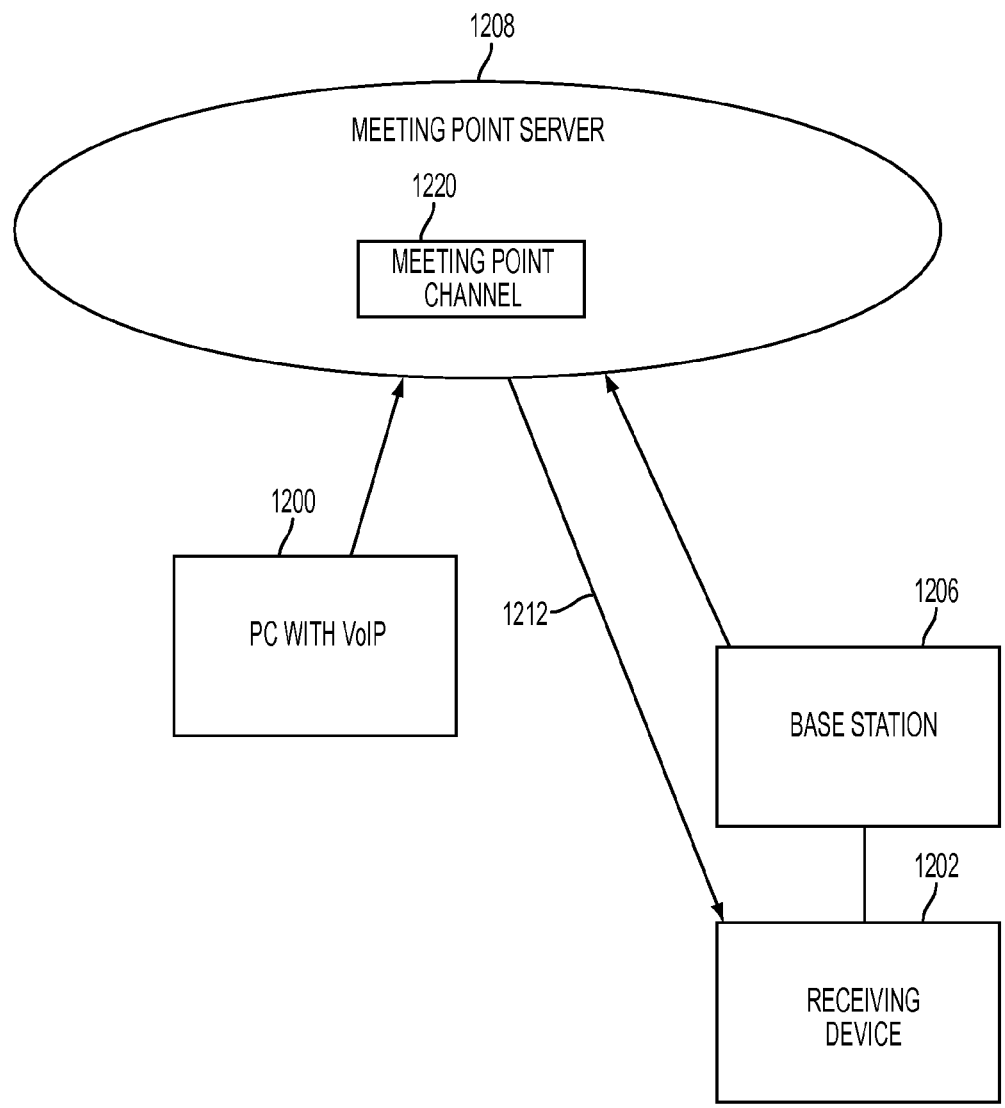
FIG. 12 is a schematic of a meeting point server for use with an embodiment of the invention.

In another embodiment, shown in FIG. 12, an indirect communication system includes a dedicated meeting point server 1208. The meeting point server 1208 is capable of receiving an instruction from a personal computer 1200 with VoIP capability. The instructions received include the number of a receiving device 1202, which may be a mobile phone, and an Internet Protocol address, for example 88.169.11.1, in a gateway field. By having a dedicated meeting point server 1208, the meeting point server 1208 is capable of transmitting a two-ring ring tone or short signal 1212.

The computer 1200 may then wait for the receiving device 1202 to connect to the meeting point channel 1220 in the meeting point server 1208. The meeting point server 1208 is also capable of receiving a connection from the receiving device 1202, via a base station 1206. The base station 1206 is a nearest base station to the receiving device 1202. The computer 1200 will thus be able to communicate with another mobile phone using VoIP, without actual knowledge of where the receiving device is located.

Figure 13:
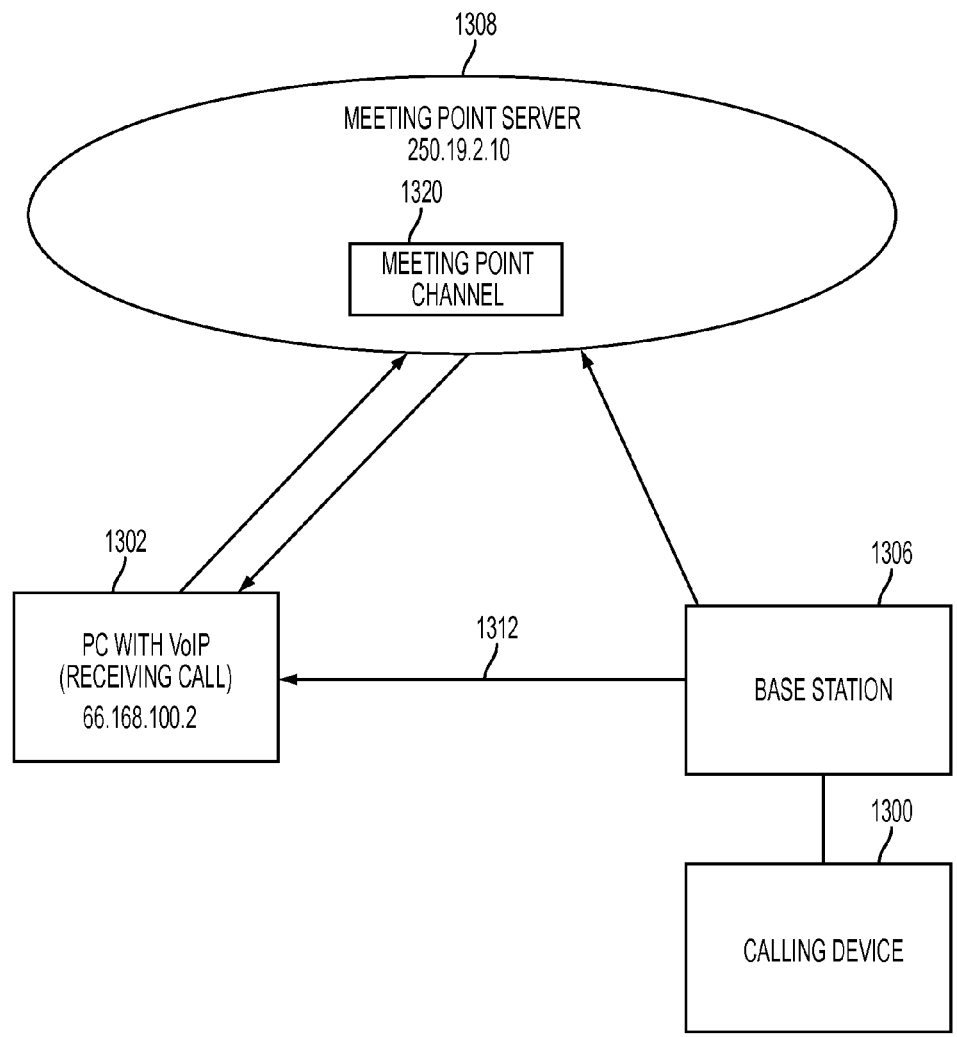
FIG. 13 is a schematic of a meeting point server for use with an embodiment of the invention.

In another embodiment, shown in FIG. 13, an indirect communication system includes a meeting point server 1308. The meeting point server 1308 is capable of receiving an instruction from the calling device 1300, which may be a mobile phone, via a base station 1306 instructing the meeting point server 1308 to connect to a computer 1302 with VoIP capability. The instruction includes an address of the computer 1302, and an address of meeting point server 1308. The meeting point server 1308 is capable of having a meeting point channel 1320 identified by the address of the computer 1302 and the address of the meeting point server 1308.

If, for example, an address of the computer 1302 is 66.168.100.2, and an address of the meeting point server 1308 is 250.19.2.10, the address of the meeting point channel might be 66.168.100.2@250.19.2.10. In one embodiment, the computer 1302 is capable of being a meeting point as well. In this case the calling device 1300 would enter an address of the receiving computer 1302, allowing the calling device 1300 to directly connect, via a base station, to the computer 1302.

A PC with broadband and VoIP may be called from the calling device 1300 as well. In the case of a direct VoIP call, the IP address of the receiving computer 1302, such as 66.168.100.2, would be entered at the calling device 1300. In this case, the meeting point is on the receiving computer 1302 (i.e. 66.168.100.2).

Alternatively, in the case of calling via the meeting point server 1308, the IP address of the receiving computer 1302, such as 66.168.100.2, or the IP address of the meeting point server 1308, such as 165.113.223.2, could be entered. In another embodiment, the IP address of the meeting point server 1308 can be a dedicated MPS or any other PC with VoIP. Also, from an application point of view, a PC with VoIP is equivalent to a SIP phone, so that the communication format in this section can also apply to an SIP phone.

Figure 14:
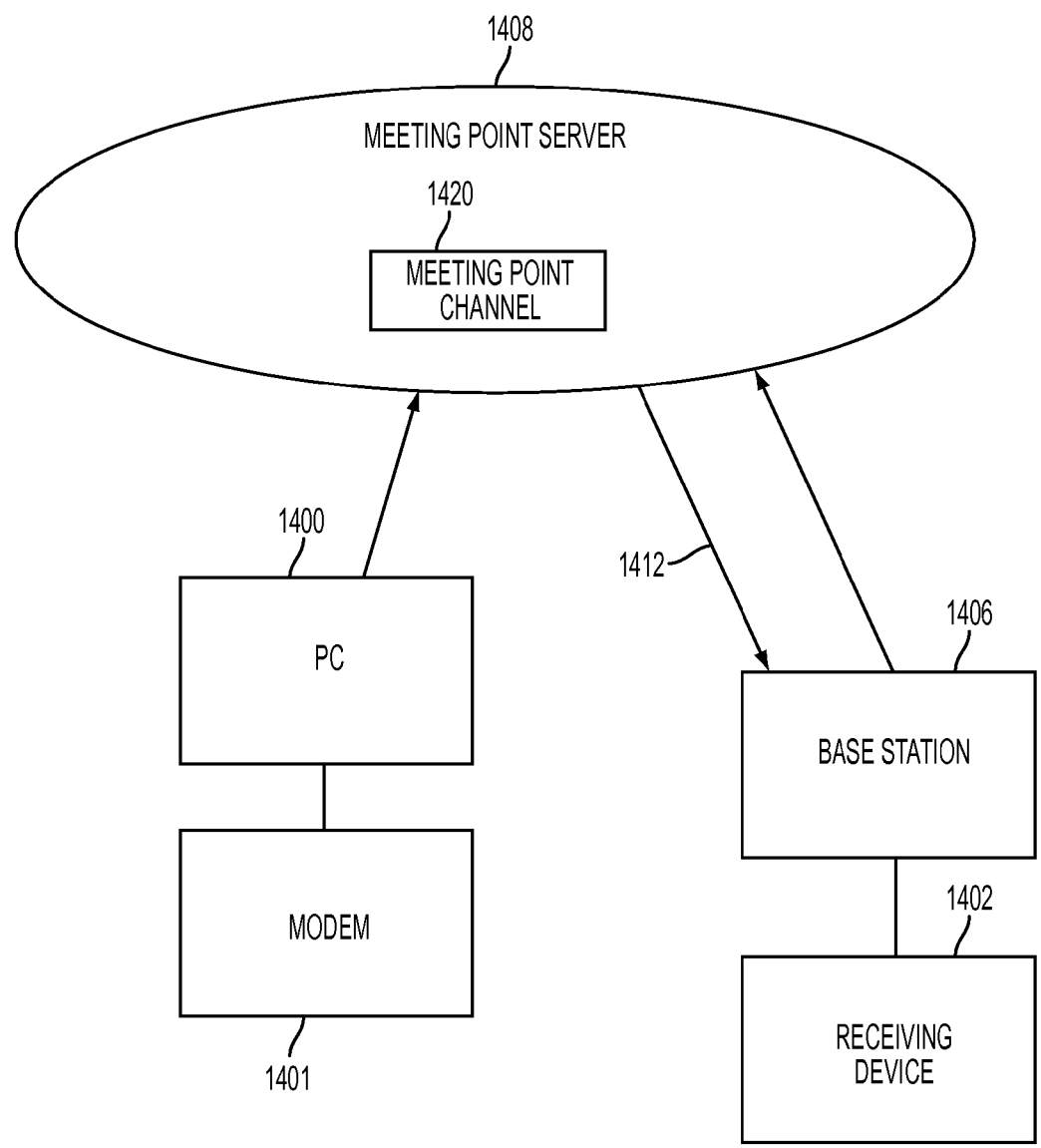
FIG. 14 is a schematic of a meeting point server for use with an embodiment of the invention.

In another embodiment, shown in FIG. 14, an indirect communication system uses a meeting point server 1408 to establish a connection between the calling computer 1400 with modem 1401 and a receiving device 1402, which may be a mobile phone. The meeting point server 1408 receives an instruction from the calling computer 1400, which has a modem, notifying the receiving device 1402 of a prospective communication. The instructions include the phone number of the receiving device 1402 and an address of the meeting point server 1408.

The meeting point server 1408 transmits a generated signal 1412 to the receiving device 1402. The meeting point server 1408 creates a meeting point channel 1420 based upon the phone number of the receiving device 1402 and the address of the meeting point server 1408. The calling computer 1400 waits for the receiving device 1402 to connect to the meeting point server 1408 after establishing connection to the meeting point server 1408. The meeting point server 1408 is capable of receiving VoIP packets directed to the meeting point server 1408 from the calling computer 1400, and redirecting the VoIP packets to the receiving device 1402. Therefore, the system allows a mobile phone to communicate with another device over the Internet, while saving money and having quality phone calls.

In one embodiment, a mobile phone may be called from a PC, which may have broadband and VoIP. In this embodiment, the VoIP client (software) is activated, and the number of the receiving device, such as 2222, is entered, along with the IP address of the meeting point server (MPS), such as 88.192.168.11.1. Note that many VoIP software clients specified by the ITU H.323 standard should contain fields for the phone number and the gateway address. If the MPS is a dedicated MPS, the MPS can generate the short ringing tone and wait for connection from the receiving device.

Figure 15:
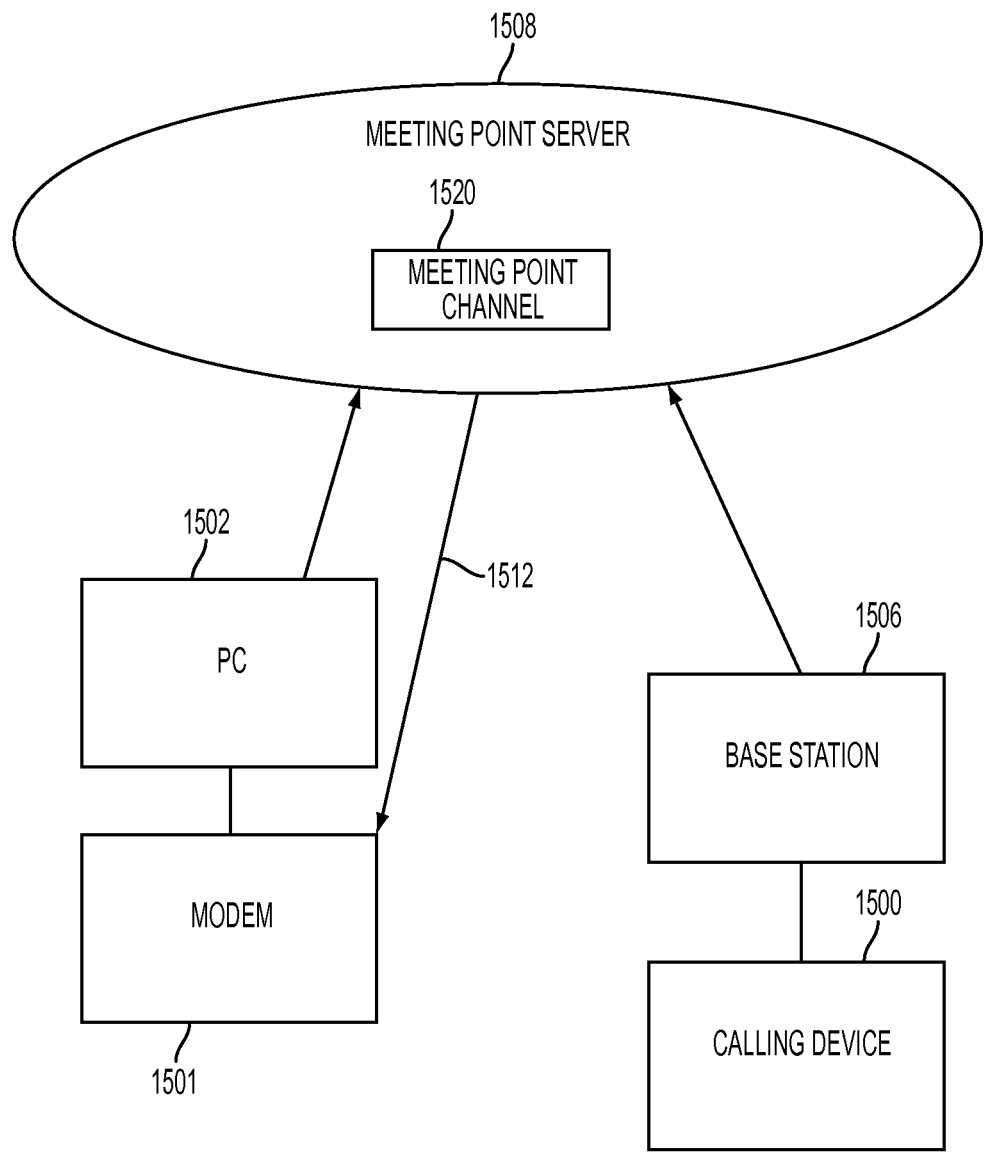
FIG. 15 is a schematic of a meeting point server for use with an embodiment of the invention.

In another embodiment, shown in FIG. 15, an indirect communication system includes a meeting point server 1508 capable of transmitting a signal 1512 and creating a meeting point channel 1520. The signal 1512 is generated when the meeting point server 1508 receives an instruction from a calling device 1500, which may be a mobile phone, via a base station 1506. The instruction includes the phone number of the receiving computer 1502, which has a modem 1501, and the address of the meeting point server 1508.

The meeting point server 1508 sends the generated signal to the receiving computer 1502. The meeting point channel 1520, in the meeting point server 1508, is capable of receiving VoIP packets from the base station 1506. The base station 1506 converts voice data, received from the calling device 1500, into VoIP packets. The meeting point server 1508 is capable of redirecting the VoIP packets, which were directed to the meeting point server 1508, to the receiving computer 1502 with modem 1501.

Figure 16:
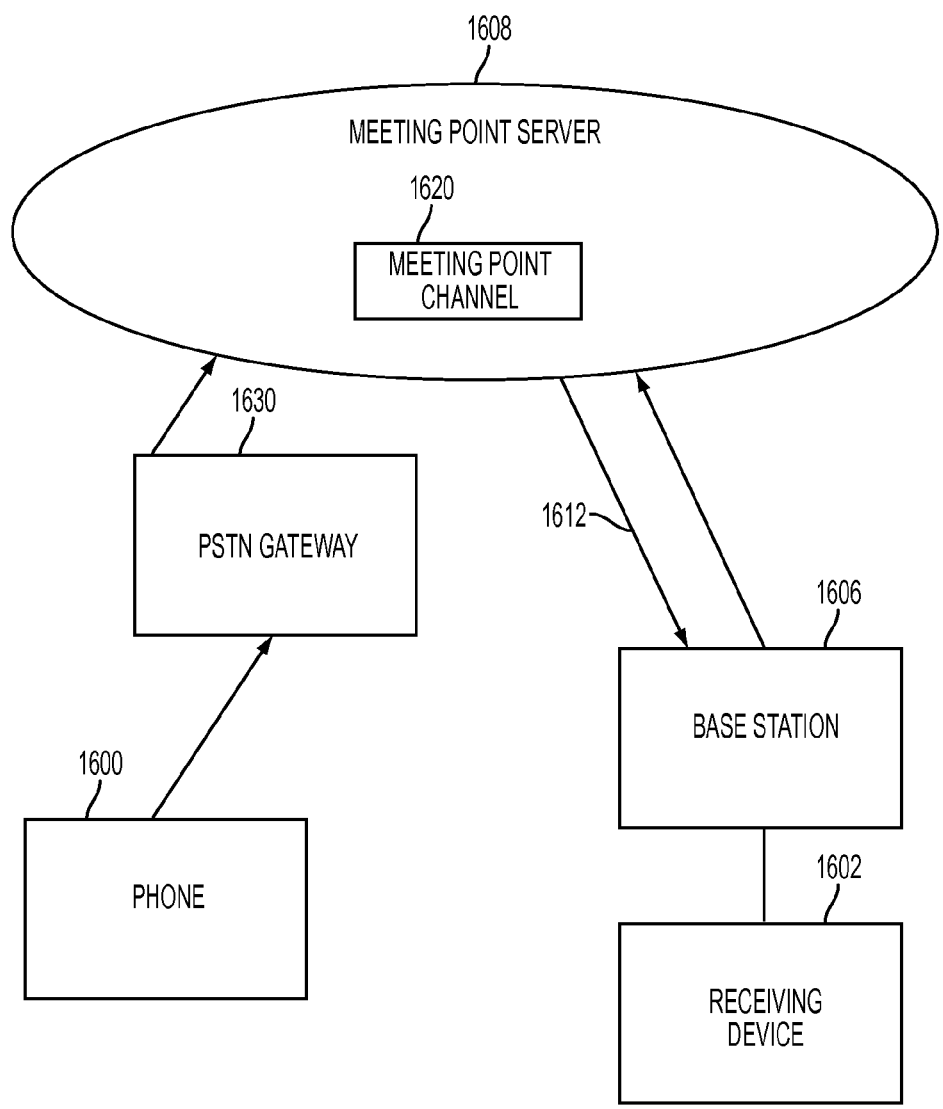
FIG. 16 is a schematic of a meeting point server for use with an embodiment of the invention.

In another embodiment, shown in FIG. 16, an indirect communication system includes a meeting point server 1608 including a PSTN gateway 1630. The meeting point server 1608 is capable of receiving a communication from a calling device, such as a phone 1600 using a public switched telephone network line via the PSTN gateway 1630. The meeting point server 1608 is also capable of receiving a communication from a receiving device 1602, which may be a mobile phone, via a base station 1608. The meeting point server 1608 is also capable of transmitting a signal to the receiving device 1602 from the phone 1600 using the public switched telephone network line via the PSTN gateway 1630, upon receiving instructions from the phone 1600. The instruction includes a phone number of the receiving device 1602 and an address of the meeting point server 1608.

The meeting point server 1608 creates a meeting point channel 1620. The phone number of the receiving device 1602 and the address of the meeting point server 1608 are combined to identify the meeting point channel 1620. The meeting point channel 1620 is capable of receiving VoIP packets, which were previously converted at the PSTN gateway 1630 when received from the calling device using a PSTN line 1601. The meeting point channel 1620 is capable of redirecting the VoIP packets to the nearest base station 1606, and from the base station 1606 to the receiving device 1602. Therefore, the phone 1600 using a public switched telephone network line can call the receiving device 1602, thereby allowing the mobile phone to incur low cost of communication and receive a quality phone call.

In one embodiment, a personal computer (PC) connected to a public switched telephone network line (ordinary phone line) with, for example, a modem can be used to make Internet connections through a dial up network. In this embodiment, the PC will dial a number to an Internet Service Provider (ISP) through a modem. The ISP would provide Internet access to the PC via the public switched telephone network line. Once connected to the Internet, a VoIP software client can be used to make a call to a mobile phone. The process is the same as calling from a PC (with broadband and VoIP) to a mobile phone.

In another embodiment, a computer connected to a public switched telephone network line with dial up network may be called from a mobile phone. First, the mobile phone makes a calling format such as 123456@165.113.223.2, where 123456 is the public switched telephone network phone number. The MPS sends a short signal to the modem and hangs up. The modem together with a specific software will activate the PC to connect to the Internet and the MPS, making the VoIP conversation possible.

In another embodiment, a mobile phone may be called from a standalone public switched telephone network line, such as a public switched telephone network line with no direct Internet access. In this embodiment, a public switched telephone network gateway may be installed in the MPS. If, for example, the telephone number for the public switched telephone network gateway is 464530, and the mobile phone number e.g. 2222, the first number can be used to form the connection between the phone 123456 and the public switched telephone network gateway inside MPS (i.e. 464530). Once connected to the MPS, the MPS can generate a short signal to mobile phone and making the final connection with the mobile phone by creating the meeting point channel 2222@165.113.223.2.

In another embodiment, a standalone public switched telephone network line, without direct Internet, may be called from a mobile phone. In this embodiment, a public switched telephone network gateway may be installed in the MPS with number 464530. A mobile phone (no.2222) can make a call to a standalone public switched telephone network phone 123456 through the MPS and the public switched telephone network gateway. First, the number of the standalone public switched telephone network e.g. 123456, is entered, and a "PSTN Call" button, or similar option, is pressed. The mobile phone will connect to the MPS and organize a meeting point channel such as 2222@165.113.223.2. By entering the number 123456 and pressing the "PSTN Call", the mobile phone will instruct the MPS and the public switched telephone network gateway to dial out the number 123456.

Figure 17:
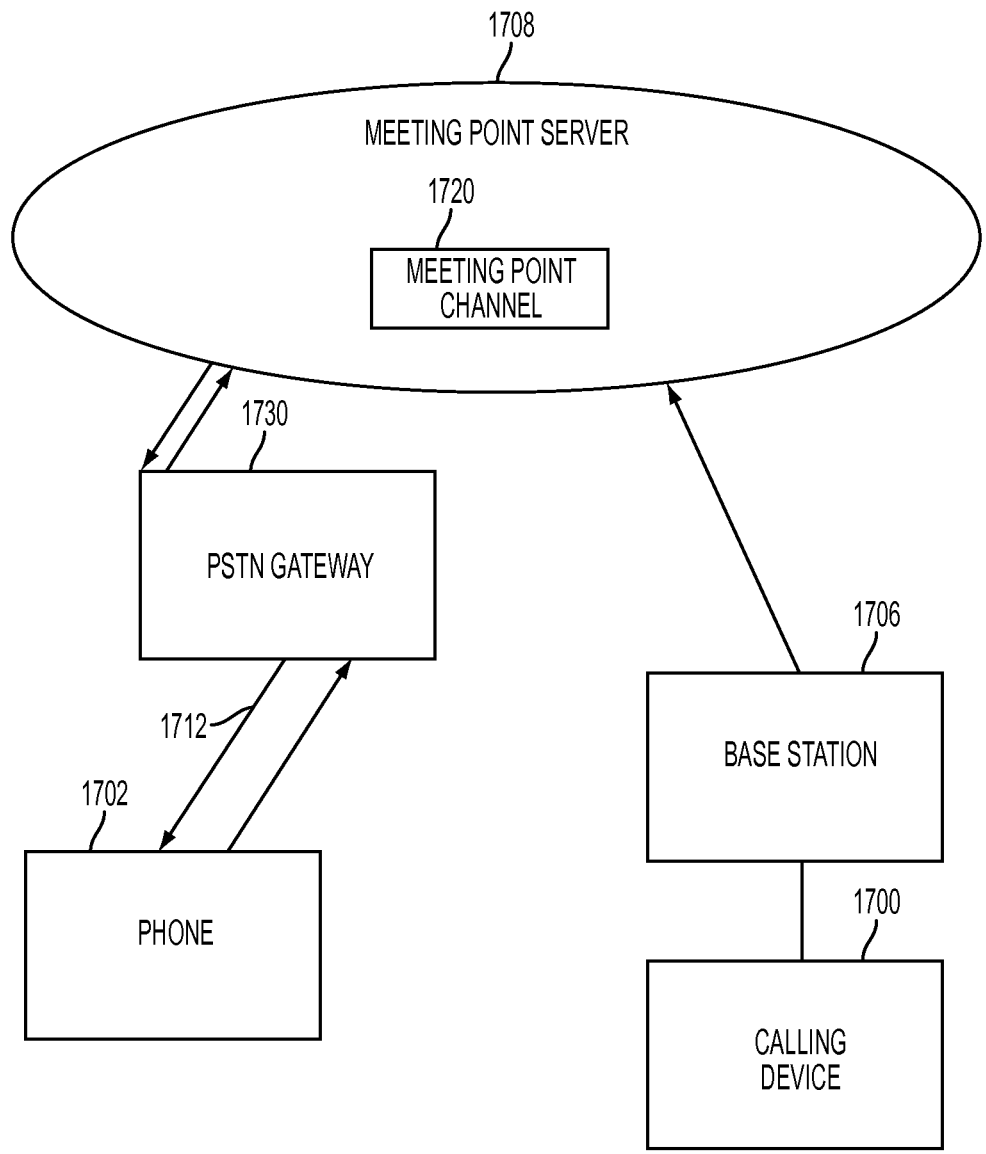
FIG. 17 is a schematic of a meeting point server for use with an embodiment of the invention.

In another embodiment, shown in FIG. 17, an indirect communication system includes a meeting point server 1708 with a temporary meeting point channel 1720. The meeting point server 1708 is connected to a phone 1702 over a PSTN gateway 1730 and a PSTN line 1712. The meeting point server 1708 is capable of supporting a connection between a calling device 1700, which may be a mobile phone, via a base station 1706, and the phone 1702 using the PSTN line 1712.

The meeting point server 1708 generates a signal to send to the phone 1702, after receiving an instruction from the calling device 1700 via the base station 1706. The instruction includes an address of the meeting point channel 1720 in the form of a combination of a phone number of the phone 1702 and the address of the meeting point server 1708. The meeting point channel 1720 is able to receive VoIP packets, which were previously converted from voice data at the base station 1706 when received from the calling device 1700. The meeting point channel 1720 is also capable of redirecting the VoIP packets to the PSTN gateway 1730. The PSTN gateway 1730 uses VoIP software to convert the packets to voice data and transmit them to the phone 1702.

Figure 18:
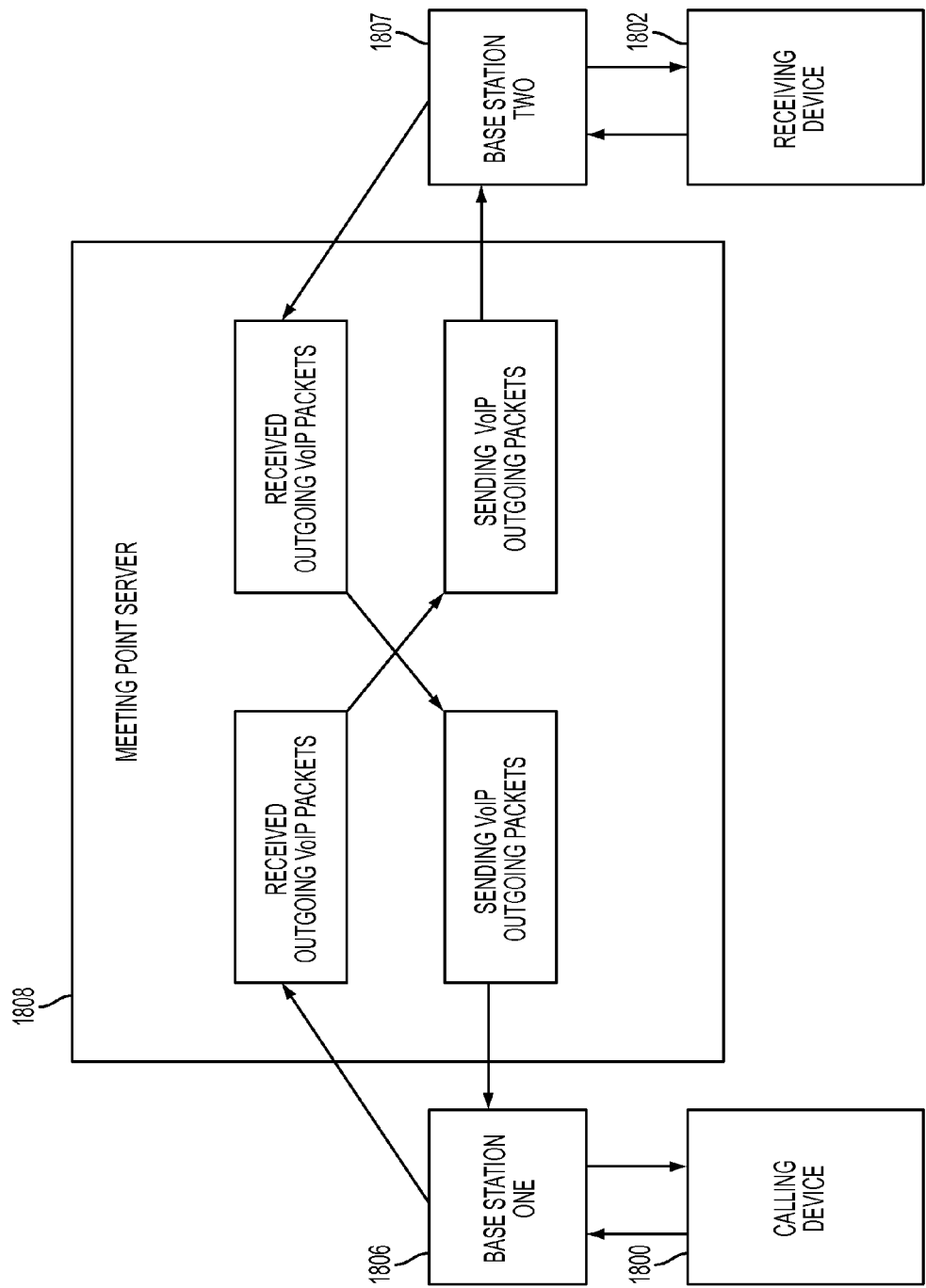
FIG. 18 is a schematic of a meeting point server for use with an embodiment of the invention.

In another embodiment, shown in FIG. 18, an indirect communication system includes a meeting point server 1808 capable of receiving outgoing VoIP packets and redirecting the outgoing VoIP packets. The received outgoing VoIP packets are received from a base station 1806 of a calling device 1800, which may be a mobile phone. The receiving outgoing VoIP packets include an IP header. The IP header includes a delivery address and a source address. The delivery address is an address of the meeting point server 1608. The source address is an address of the base station 1806 of the calling device 1800.

The meeting point server 1808 redirects the packets to base station 1807 of the receiving device 1802 by changing the delivery address from the address of the meeting point server 1808 to the address of the base station 1807 of a receiving device 1802, which may also be a mobile phone. The meeting point server 1808 also changes the source address from the address of the base station 1806 of the calling device 1800 to the address of the meeting point server 1808. This embodiment allows a mobile phone to communicate with any device using the Internet. The roles of the calling device 1800 and the receiving device 1802 may be reversed, without loss of generality.

Figure 19:
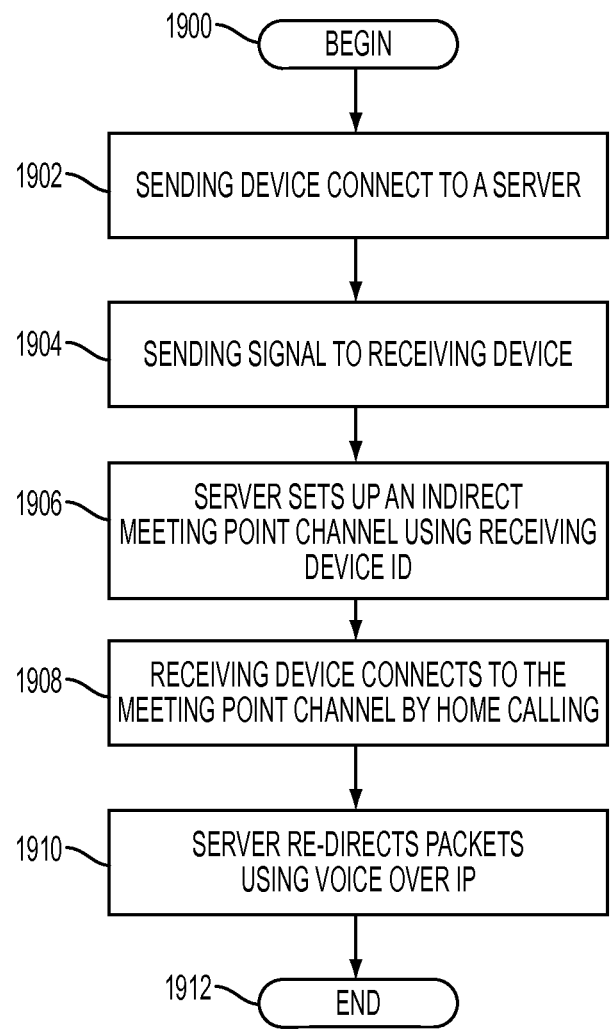
FIG. 19 is a process chart of an indirect communication method according to an embodiment of the invention.

In FIG. 19, there is shown a process chart of an indirect communication method. In operation 1900, the process begins. In operation 1902, a signal is sent to a receiving device notifying the receiving device of a prospective. In operation 1904, a calling device connects to a meeting point server. In operation 1906, the meeting point server generates an indirect meeting point channel. In operation 1908, a receiving device connects to the indirect meeting point server. In operation 1910, packets received from the calling device are redirected to the receiving device at the meeting point channel. In operation 1912, the process ends.

Figure 20:
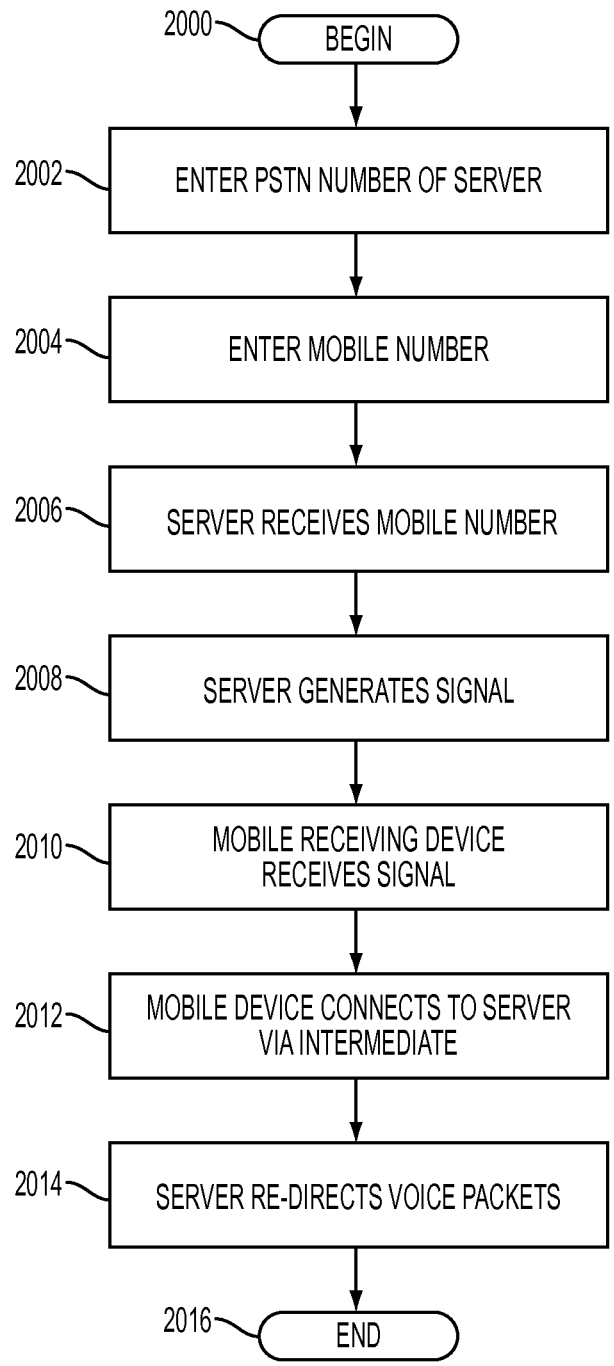
FIG. 20 is a process chart of address generation for use with an embodiment of the invention.

In FIG. 20, there is shown a process chart of address generation for use with an embodiment of the indirect communication method. In operation 2000, the process begins. In operation 2002, a public switched telephone network number of a meeting point server is entered. In operation 2004, a number of a mobile device is entered. In operation 2006, the meeting point server receives the number of the mobile device. In operation 2008, the meeting point server generates a signal including a short, two-ring tone, an address of the server, and the number of the mobile phone. In operation 2010, the mobile receiving device receives the signal. In operation 2012, the mobile receiving device connects to the meeting point server. In operation 2014, the meeting point server redirects packets received from the calling device to the receiving device. In operation 2016, the process ends.

Figure 21:
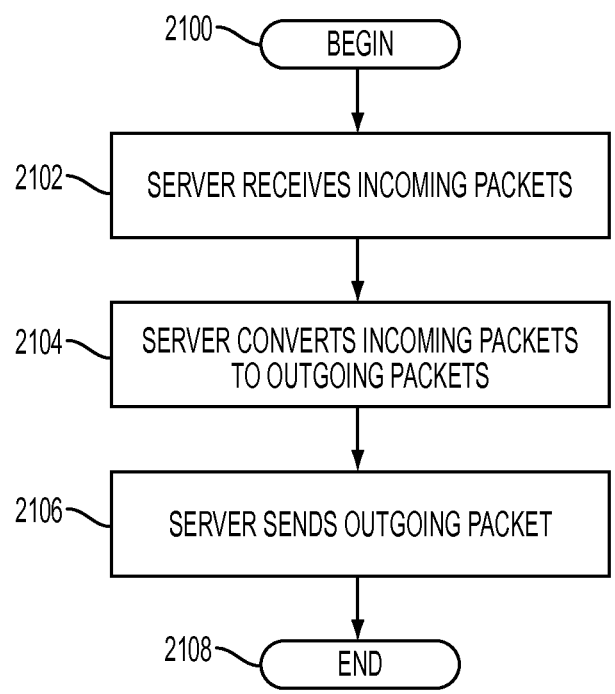
FIG. 21 is a process chart of packet redirection for use with an embodiment of the invention.

In FIG. 21, there is shown a process of packet redirection for use with an embodiment of the indirect communication method. In operation 2100, the process begins. In operation 2102, a meeting point server receives incoming packets from a calling device. In operation 2104, the meeting point server converts the incoming packets to outgoing packets by replacing a delivery address with an address of a receiving device and replacing a source address with an address of the meeting point server. In operation 2106, the meeting point server sends the outgoing packets received from the calling device to the receiving device. In operation 2108, the process ends.

Figure 22:
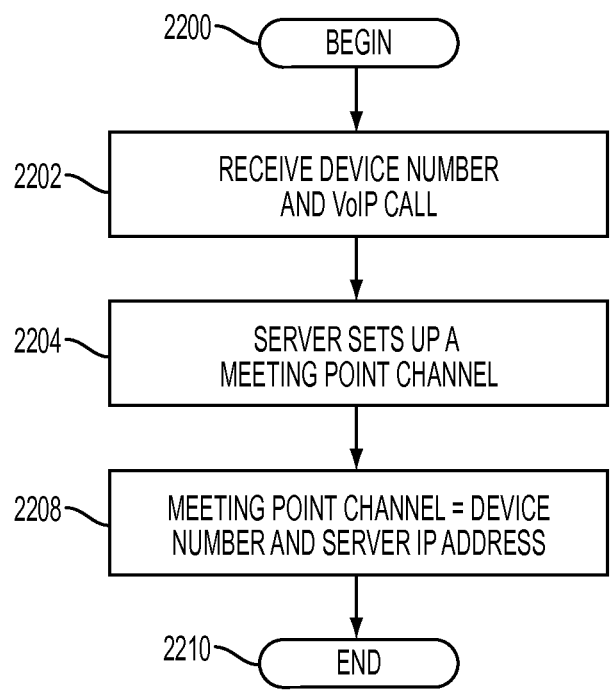
FIG. 22 is a process chart of setting up a meeting point channel for use with an embodiment of the invention.

In FIG. 22, there is shown a process of setting up a meeting point channel for use with an embodiment of the indirect communication method. In operation 2200, the process begins. In operation 2202, a meeting point server receives a number of a receiving device and a VoIP call. In operation 2204, the meeting point server sets up a meeting point channel. In operation 2208, the meeting point server an address to the meeting point channel composed of the number of the receiving device and an address of the meeting point server. In operation 2210, the process ends.

Figure 23:
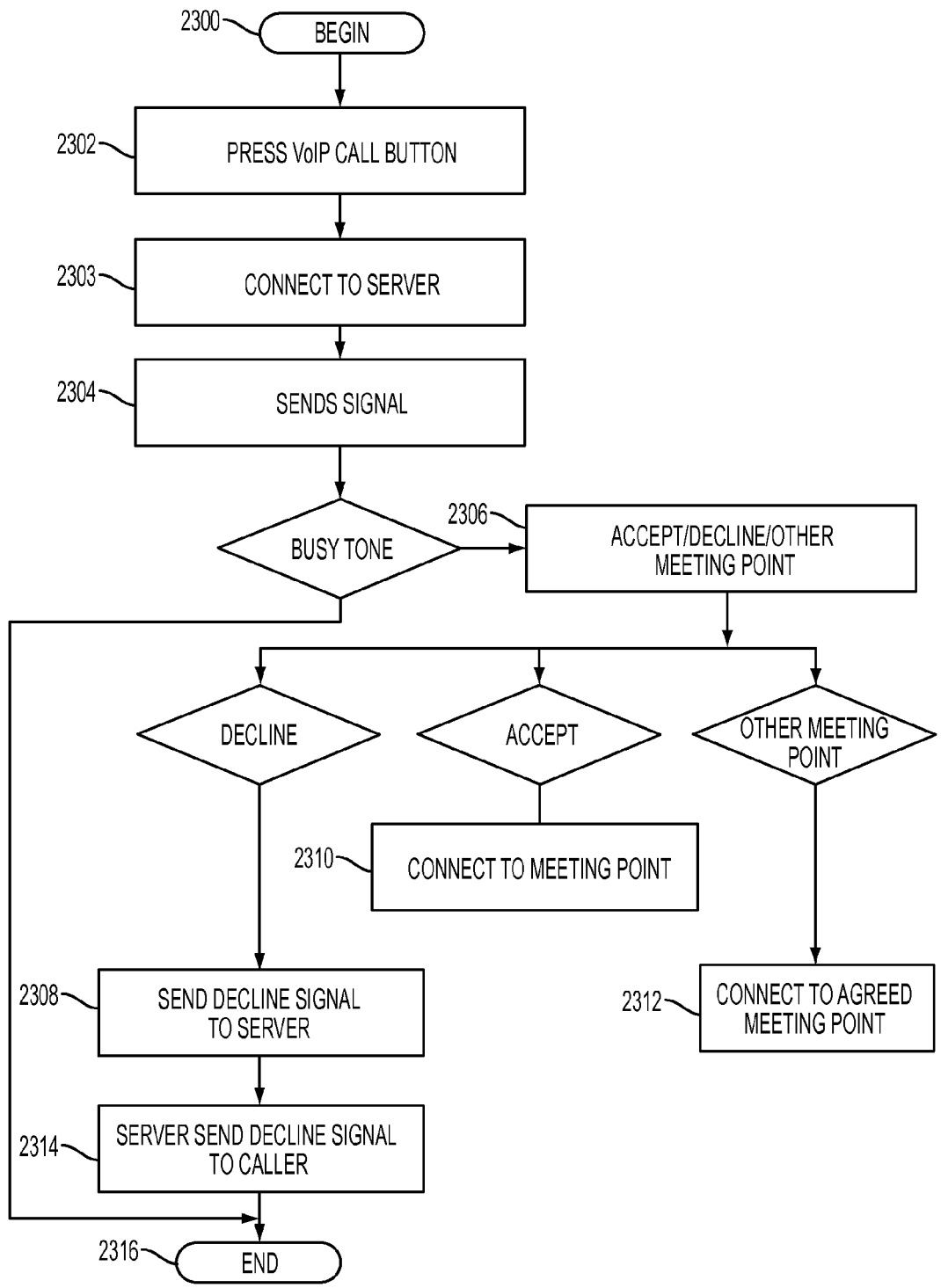
FIG. 23 is a process chart of setting up a telephone call for use with an embodiment of the invention.

In FIG. 23, there is shown a process of setting up a telephone call for use with an embodiment of the indirect communication method. In operation 2300, the process begins. In operation 2302, a VoIP call button is pressed on a calling device. In operation 2303, the calling device connects to a server. In operation 2304, the calling device sends a signal to a receiving device. In operation 2306, unless the receiving device is busy, the receiving device either declines the call, accepts the call, or counter-offers an alternate meeting point. In operation 2308, the receiving device declines. In operation 2310, the receiving device accepts, and connects to a meeting point server. In operation 2312, the receiving device counter-offers an alternate meeting point, and connects to the alternate meeting point. In operation 2314, the decline message of operation 2308 is sent to the meeting point server. In operation 2316, the process ends.

Figure 24:
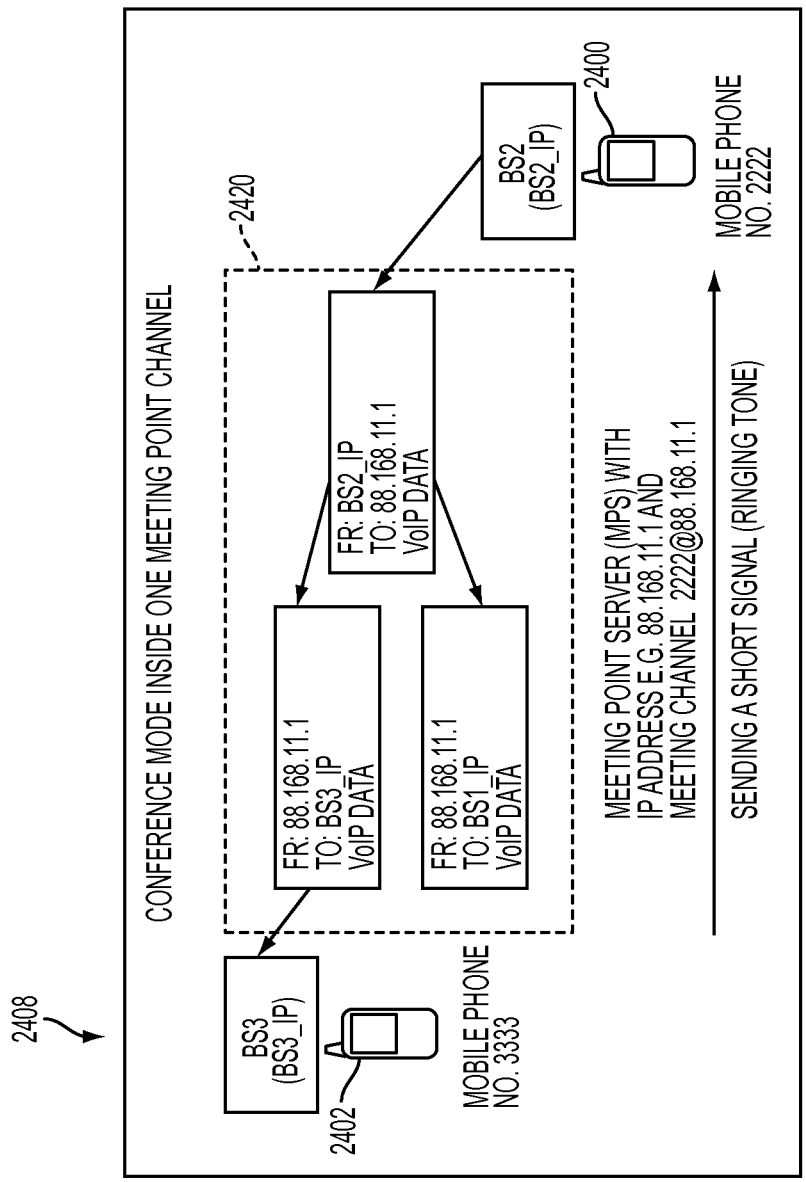
FIG. 24 is a schematic of a meeting point server for use with an embodiment of the invention.

In FIG. 24, there is shown a meeting point server 2408 capable of supporting a connection between calling device 2400 and a plurality of receiving devices 2402, such as during a conference call. In this case, the meeting point server 2408 would copy each packet received from calling device 2400 inside a meeting point channel 2420 and redirect the copies to individual receiving devices 2402 connected to the meeting point channel 2420.

Each of the receiving devices 2402 would have formed a connection with meeting point server 2408 after receiving the short, two-tone signal, but without answering the call represented by the short, two-tone signal, or else hanging up immediately. Thus, each of the receiving devices 2402 would hear the calling device 2400. Mobile phones can join the conference call even when the conference call is already in progress. This can be done by making a connection with the meeting point channel or the hosting mobile phone. In a normal situation, when the meeting point channel is "2222@88.168.11.1," the hosting mobile phone number is 2222. Therefore, an advantage of the embodiment is that the indirect communication system allows any mobile device to communicate to with a plurality of devices through meeting point server 2408, such as by Voice over Internet Protocol (VoIP), while avoiding the use of airtime.

Figure 25:
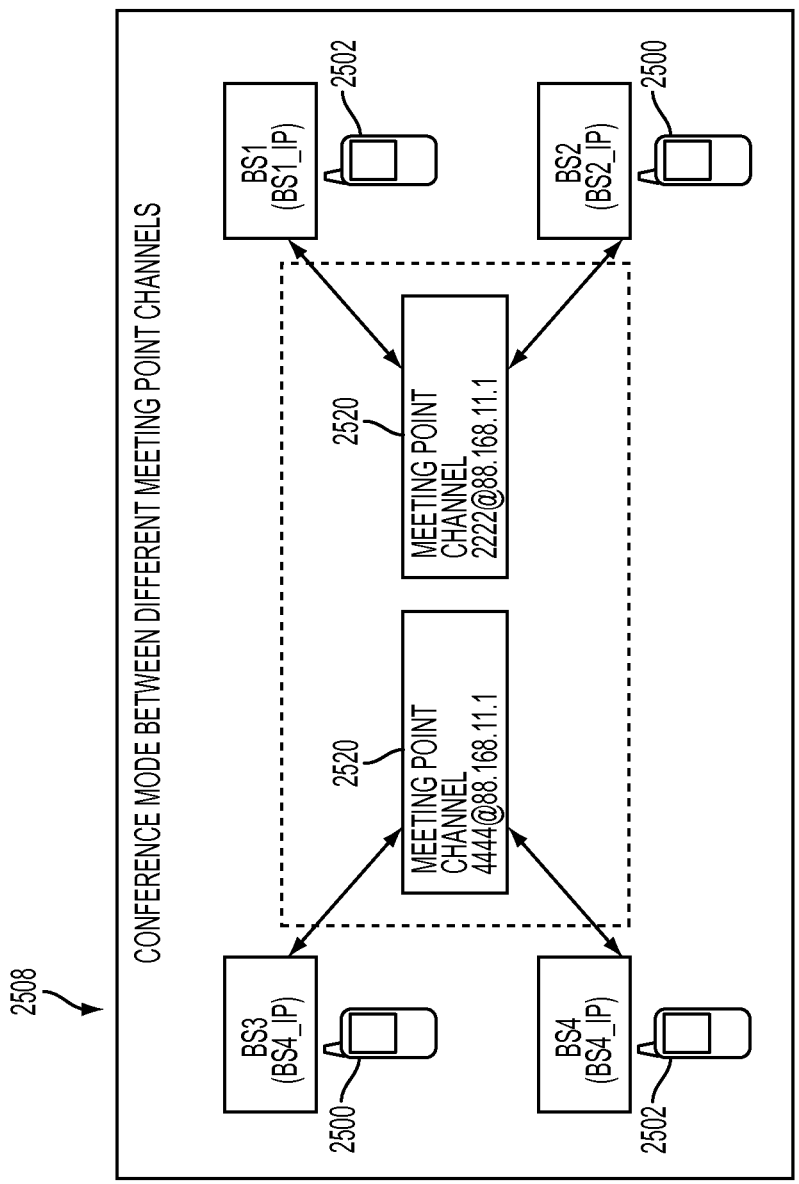
FIG. 25 is a schematic of a meeting point server for use with an embodiment of the invention.

In FIG. 25, there is shown a meeting point server 2508 capable of supporting a connection between a plurality of calling devices 2500 and a plurality of receiving devices 2502, such as during a conference call. In this case, the meeting point server 2508 would copy each packet received from each of the calling devices 2500 inside a meeting point channel 2520 and redirect the copies to individual receiving devices 2502 at the meeting point channels 2520. Meeting point server 2508 could further support a plurality of meeting point channels 2520. Each of the plurality of meeting point channels 2520 could support, in turn, a plurality of calling devices 2500 or receiving devices 2502. Calling devices 2500 and receiving devices 2502 may be similar functionally, differing only in the current direction of communication from or to the meeting point server 2508.

Each of the receiving devices 2502 may have formed a connection with meeting point server 2508 after receiving the short, two-tone signal, but without answering the call represented by the short, two-tone signal, or else hanging up immediately. Thus, each of the receiving devices 2502 would hear each of the calling devices 2500. Therefore, an advantage of the embodiment is that the indirect communication system allows any mobile device to communicate with a plurality of devices through meeting point server 2508, such as by Voice over Internet Protocol (VoIP), while avoiding the use of airtime.

In one embodiment, the indirect communication system is implemented by manufacturing dedicated hardware mobile phones. In this way, the following new functions can be added along with the existing mobile features: transmitting and receiving compatible RF with wireless media such as WiMAX and connecting to a base station; generating an indirect ringing tone to receiving devices (mobile phones); setting up the Meeting Point Channel on the Internet with VoIP (e.g. a meeting point server); and communicating with the receiving device with VoIP.

By developing the dedicated mobile phone, full access and control of menu, interfaces including options, radio boxes, check boxes, and push button can be obtained. In this embodiment, the mobile phone circuit design may contain the hardware, such as a chipset.

In another embodiment, the indirect communication system is implemented by downloading software to a mobile phone, such as via the wireless media. Such a mobile phone may be a programmable mobile phone, which is controllable by a third party. The downloadable software may include a menu, an interface, radio boxes, check boxes, and option press buttons. The mobile phone may have the ability to generate or switch to the compatible RF with the wireless media connecting to the BS in order to communicate with the BS. Software for the mobile phones may be upgraded with new features, and additional functions may be added. In one embodiment, the indirect communication system could be implemented purely by software. In other embodiments, in addition to the wireless download, the download mechanism to mobile phones can also be a CD via a PC, direct or indirect memory card and stick, Internet Web Site, and others.

In another embodiment, an add-on device may be added to existing mobile phones, i.e. a two-way or Walkie-Talkie style phone, to implement the indirect communication system. In order to reach a wider range of mobile phone users, an add-on (or plug-in) hardware to be added at the bottom of the mobile phone may be provided. For this implementation, the add-on device turns the existing mobile phone into a "Two-way Walkie-Talkie" type. That is, the add-on device captures the voice at the mobile phone and transmits the signal to the BS via the wireless media. In one embodiment, the communication between the add-on device and BS is similar to a Walkie-Talkie. In addition to the hardware add-on device, the software inside the add-on device can also be software downloadable so that an up-grade is easily available.

In another embodiment, referring again to FIG. 1, the calling device 100 and the receiving device 102 could be on different networks. In general, a voice over IP network can be considered to be an implementation of a particular "server" running on the Internet, and a particular piece of software (or hardware) known as a "client," which is installed on a computer or other device for making the connection. In some instances, one voice over IP network will not be able to make calls directly to another voice over IP network. This may be the case if, for example, there is an incompatibility between the implementations of the server from which the call originates, and the destination server, such as different protocols, standards, and proprietary issues.

This may also be the case if there is an incompatibility between the implementations of the clients, which may also be due to different protocols or standards, as well as to different usernames and passwords. The calling device 100 could be a GSM phone, for example, while the receiving device 102 is a CDMA phone. In this case, the calling device 100 does not need to know on what kind of network the receiving device 102 is operating.

The calling device 100, rather, sends an instruction about the network of the calling device 100, in addition to the short ringing tone, to the receiving device 102 when commencing the call. The receiving device 102, after receiving the details of the network of the calling device 100, can activate the appropriate client software to suit the network of the calling device 100, and connect to the Internet 114 and the particular meeting point server 108.

For one voice over IP network, only one piece of client software needs to be installed on the calling device 100. The client software can be downloaded to the calling device 100, and activated only when needed. This arrangement can reduce airtime since the voice over IP network will not need to be active, online, or on air, at all times.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

The many features and advantages of the invention are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation shown and described, and accordingly all suitable modifications and equivalents may be resorted to, falling within the scope thereof.

What is claimed is:

1. An indirect communication system, comprising:
   a calling device sending a signal to a receiving device over a first channel, the calling device hanging up the signal before receiving a response from the receiving device;
   a meeting point generator organizing a meeting point channel unique to the receiving device in response to an instruction from the calling device;
   the calling device connecting to the meeting point channel corresponding to the receiving device;
   the receiving device automatically making a call connecting to the meeting point channel; and
   the meeting point channel receiving packets from the calling device and redirecting the packets to the receiving device.

2. The indirect communication system of claim 1, wherein the receiving device is a handset, a phone, a gateway, a base station, a server, a cell tower, a transceiver, or a computer.

3. The indirect communication system of claim 1, wherein the calling device is a handset, a phone, a gateway, a base station, a server, cell tower, a transceiver, or a computer.

4. The indirect communication system of claim 1, wherein the meeting point channel is generated in a server, a computer, a base station, a handset, a Voice over Internet Protocol handset, a Voice over Internet Protocol controller, a switch box, or a dedicated black box device and peripherals.

5. The indirect communication system of claim 1, wherein the meeting point channel comprises Voice over Internet Protocol controlling and administration matrices to handle large number of calls simultaneously.

6. The indirect communication system of claim 1, wherein the calling device generates a multi-tone ring tone.

7. The indirect communication system of claim 1, wherein the calling device resides on a server.

8. The indirect communication system of claim 1, wherein an address of the meeting point channel comprises an identification number of the receiving device and an Internet Protocol address or a Domain Name System name of the meeting point generator.

9. The indirect communication system of claim 1, wherein if the receiving device accepts the communication, the receiving device connects to the meeting point channel.

10. The indirect communication system of claim 1, wherein if the receiving device declines the communication, the receiving device sends a decline message to the meeting point channel and the meeting point channel relays the decline message to the calling device.

11. The indirect communication system of claim 1, wherein if the receiving device suggests an alternative meeting point channel, the receiving device connects to the alternative meeting point channel.

12. The indirect communication system of claim 1, wherein the received packets are formatted with a format selected from the group consisting of:
   Voice over Internet Protocol, Internet Protocol, and User Datagram Protocol.

13. The indirect communication system of claim 1, wherein the redirecting comprises:
   changing a sending address of each packet header from an address of the meeting point channel to an address of the receiving device.

14. The indirect communication system of claim 1, wherein the communication comprises voice, internet TV, audio, movies, video conferencing, still images, or moving images.

15. The indirect communication system of claim 1, comprising further:
   a plurality of receiving devices;
   wherein each packet received from the calling device is copied a plurality of times at the meeting point channel; and
   wherein each of the copied packets is redirected to one of the plurality of receiving devices.

16. The indirect communication system of claim 1, wherein:
   said calling device operates on a first network; and
   said receiving device operates on a second network, said second network being incompatible with said first network, and
   said notifier includes an instruction about the first network.

17. An indirect communication method, comprising:
   sending a signal from a calling device to a receiving device over a first channel;
   hanging up the signal before receiving a response from the receiving device;
   organizing a meeting point channel to the receiving device in response to an instruction from the calling device;
   connecting the calling device to the meeting point channel corresponding to the receiving device;
   automatically making a call connecting the receiving device to the meeting point channel;
   receiving packets from the calling device at the meeting point channel; and
   redirecting the packets to the receiving device at the meeting point channel.

18. The indirect communication method of claim 17, comprising further:
   copying each packet received from the calling device a plurality of times at the meeting point channel; and
   redirecting each of the copied packets to one of a plurality of receiving devices.

19. The indirect communication method of claim 17, wherein the receiving device is a handset, a phone, a gateway, a base station, a server, a cell tower, a transceiver, or a computer.

20. The indirect communication method of claim 17, wherein the calling device is a handset, a phone, a gateway, a base station, a server, cell tower, a transceiver, or a computer.

21. The indirect communication method of claim 17, wherein the meeting point channel is generated in a server, a computer, a base station, a handset, a Voice over Internet Protocol handset, a Voice over Internet Protocol controller, a switch box, or a dedicated black box device and peripherals.

22. The indirect communication method of claim 17, wherein the meeting point channel comprises Voice over Internet Protocol controlling and administration matrices to handle large number of calls simultaneously.

23. The indirect communication method of claim 17, wherein the calling device generates a multi-tone ring tone.

24. The indirect communication method of claim 17, wherein the signal is transmitted from a server.

25. The indirect communication method of claim 17, wherein an address of the meeting point channel comprises an identification number of the receiving device and an Internet Protocol address or a Domain Name System name of the meeting point generator.

26. The indirect communication method of claim 17, wherein if the receiving device accepts the communication, the receiving device connects to the meeting point channel.

27. The indirect communication method of claim 17, wherein if the receiving device declines the communication, the receiving device sends a decline message to the meeting point channel and the meeting point channel relays the decline message to the calling device.

28. The indirect communication method of claim 17, wherein if the receiving device suggests an alternative meeting point channel, the receiving device connects to the alternative meeting point channel.

29. The indirect communication method of claim 17, wherein the received packets are formatted with a format selected from the group consisting of:
Voice over Internet Protocol, Internet Protocol, and User Datagram Protocol.

30. The indirect communication method of claim 17, wherein the redirecting comprises:
changing a sending address of each packet header from an address of the meeting point channel to an address of the receiving device.

31. The indirect communication method of claim 17, comprising further:
notifying the receiving device of a network of the calling device; and
activating at the receiving device software associated with the network of the calling device.

32. An indirect communication system, comprising:
means for sending a signal from a calling device to a receiving device over a first channel;
means for hanging up the signal before receiving a response from the receiving device;
means for organizing a meeting point channel unique to the receiving device in response to an instruction from the calling device;
means for connecting the calling device to the meeting point channel corresponding to the receiving device;
means for automatically making a call connecting the receiving device to the meeting point channel;
means for receiving packets from the calling device at the meeting point channel; and
redirecting the packets to the receiving device at the meeting point channel.

33. An indirect communication system, comprising:
a generator transmitting a two-ring ring tone signal to a receiving device after receiving an instruction from a calling device, the two-ring ring tone notifying the receiving device of a prospective communication;
a meeting point creator creating a meeting point channel unique to the receiving device in a meeting point server, the calling device hanging up the two-ring ring tone signal from the calling device to the receiving device before receiving a response from the receiving device, the address of the meeting point channel being a phone number of the receiving device and an address of the server, the receiving device automatically making a call connecting to the meeting point channel; and
a redirector receiving, in the meeting point channel, captured voice data in outgoing Voice over Internet Protocol packets identified by a packet header, the packet header having a delivery address of the server and a source address of the calling device, and redirecting a copy of each of the outgoing Voice over Internet Protocol packets to the receiving device by changing the delivery address of the packet header to an address of the receiving device and changing the source address of the packet header to an address of the server.

34. An indirect communication method, comprising:
transmitting a two-ring ring tone signal to a receiving device after receiving an instruction from a calling device, the two-ring ring tone notifying the receiving device of a prospective communication;
creating a meeting point channel unique to the receiving device in a meeting point server, the calling device hanging up the two-ring ring tone signal from the calling device to the receiving device before receiving a response from the receiving device, the address of the meeting point channel being a phone number of the receiving device and an address of the server, the receiving device automatically making a call connecting to the meeting point channel;
receiving, in the meeting point channel, captured voice data in outgoing Voice over Internet Protocol packets identified by a packet header, the packet header having a delivery address of the server and a source address of the calling device; and
redirecting a copy of each of the outgoing Voice over Internet Protocol packets to the receiving device by changing the delivery address of the packet header to an address of the receiving device and changing the source address of the packet header to an address of the server.

35. The indirect communication system of claim 1, wherein the receiving device makes the call connecting to the meeting point channel in response to the signal from the calling device.

36. The indirect communication method of claim 17, wherein the receiving device makes the call connecting to the meeting point channel in response to the signal from the calling device.

\* \* \* \* \*

UNITED STATES PATENT AND TRADEMARK OFFICE
CERTIFICATE OF CORRECTION

Page 1 of 1

PATENT NO.         : 8,503,431 B2
APPLICATION NO.    : 11/808753
DATED              : August 6, 2013
INVENTOR(S)        : Pak Kay Yuen et al.

It is certified that error appears in the above-identified patent and that said Letters Patent is hereby corrected as shown below:

In the Claims

In Col. 30, Line 21, In Claim 17, after "channel" insert -- unique --.

Signed and Sealed this
Twelfth Day of November, 2013

Teresa Stanek Rea
*Deputy Director of the United States Patent and Trademark Office*